United States Patent
Wang et al.

[19]

[11] Patent Number: 6,098,495
[45] Date of Patent: Aug. 8, 2000

[54] ROTATABLE VALVE ASSEMBLY

[75] Inventors: Zhenggang Wang, Tulsa; John A. Tomasko, Claremore; Stephen P. Farwell, Owasso, all of Okla.

[73] Assignee: BS&B Safety Systems, Inc., Tulsa, Okla.

[21] Appl. No.: 09/374,219

[22] Filed: Aug. 13, 1999

Related U.S. Application Data

[62] Division of application No. 08/706,174, Aug. 30, 1996, Pat. No. 5,947,445.

[51] Int. Cl.[7] ......................................................... G05G 1/00
[52] U.S. Cl. ................................................ 74/581; 74/102
[58] Field of Search ............................... 74/102, 581, 584

[56] References Cited

U.S. PATENT DOCUMENTS

| | | | |
|---|---|---|---|
| 2,304,491 | 12/1942 | Allen | 137/70 |
| 2,358,101 | 9/1944 | Randall | 137/70 |
| 2,905,358 | 9/1959 | Herbage | 220/89 |
| 3,039,482 | 6/1962 | Goldberg | 137/68 |
| 3,472,284 | 10/1969 | Hosek | 138/89 |
| 3,603,333 | 9/1971 | Anderson | 137/70 |
| 4,669,322 | 6/1987 | Messinger et al. | 74/42 |
| 4,724,857 | 2/1988 | Taylor | 137/67 |
| 4,787,409 | 11/1988 | Taylor | 137/67 |
| 4,930,536 | 6/1990 | Taylor | 137/70 |
| 4,977,918 | 12/1990 | Taylor | 137/70 |
| 5,012,834 | 5/1991 | Taylor | 137/70 |
| 5,087,511 | 2/1992 | Taylor | 137/67 |
| 5,116,089 | 5/1992 | Taylor | 292/78 |
| 5,146,942 | 9/1992 | Taylor | 137/67 |
| 5,209,253 | 5/1993 | Taylor | 137/67 |
| 5,226,442 | 7/1993 | Taylor | 137/70 |
| 5,233,884 | 8/1993 | Rochte | 74/581 |
| 5,273,065 | 12/1993 | Taylor | 137/70 |
| 5,297,575 | 3/1994 | Taylor | 137/70 |
| 5,311,878 | 5/1994 | Taylor | 137/67 |
| 5,318,060 | 6/1994 | Taylor | 137/67 |
| 5,348,039 | 9/1994 | Taylor | 137/70 |
| 5,373,864 | 12/1994 | Taylor | 137/67 |
| 5,433,329 | 7/1995 | Taylor | 137/69 |

OTHER PUBLICATIONS

"Watts® Series QF Quarter–Flex High Performance Butterfly Valve," published by Watts® Regulator Industrial Products Division.

*Primary Examiner*—John Fox
*Attorney, Agent, or Firm*—Lawrence R. Watson; Gardere & Wynne

[57] ABSTRACT

Rotatable valve assembly includes a mounting mechanism for rotatably mounting a valve in a housing. The mounting mechanism includes a shaft having an outside end extending through the housing. A conversion mechanism converts fluid pressure in the housing into torque exerted on the shaft. A release mechanism is located outside the housing for preventing rotation of the shaft and valve when the torque exerted on the shaft is below a selected magnitude. A linearizing mechanism converts the forces exerted on the release mechanism by the shaft into a linear force. The release mechanism allows the shaft to rotate when the torque exerted on the shaft and the linear force exerted on the release mechanism exceeds a selected magnitude. A seal is provided for sealing the gap between the valve and the housing in the closed position of the valve. The seal includes a support edge sealingly secured to the housing, a sealing edge extending inwardly from the support edge into contact with the valve circumference in the closed position of the valve, and a seal body connected between the support edge and the sealing edge and spacing the sealing edge axially towards the inlet face of the valve from the support edge.

13 Claims, 16 Drawing Sheets

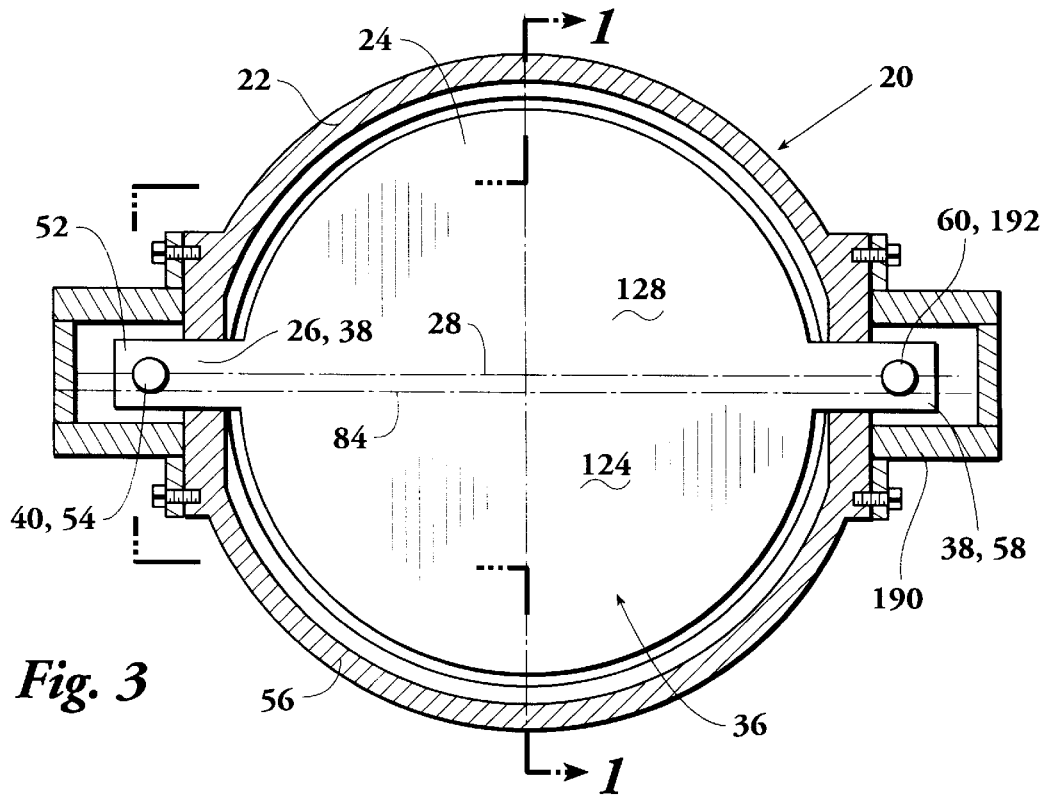
*Fig. 3*
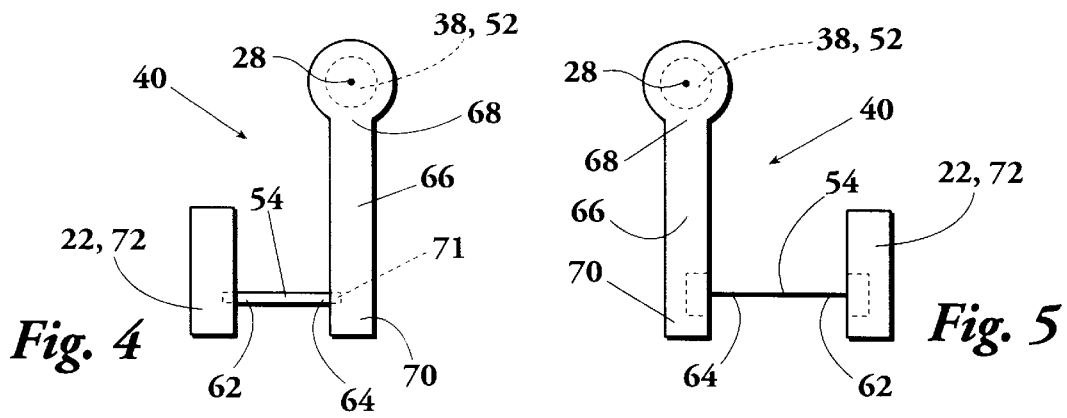
*Fig. 4*   *Fig. 5*
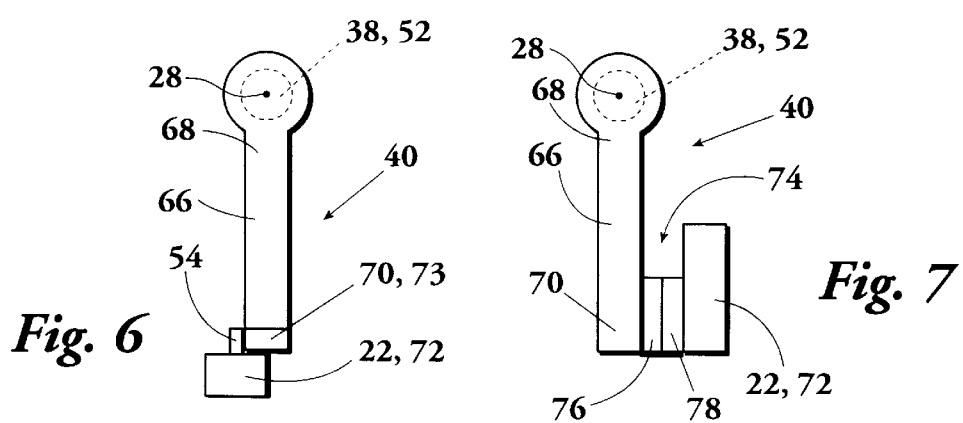
*Fig. 6*   *Fig. 7*

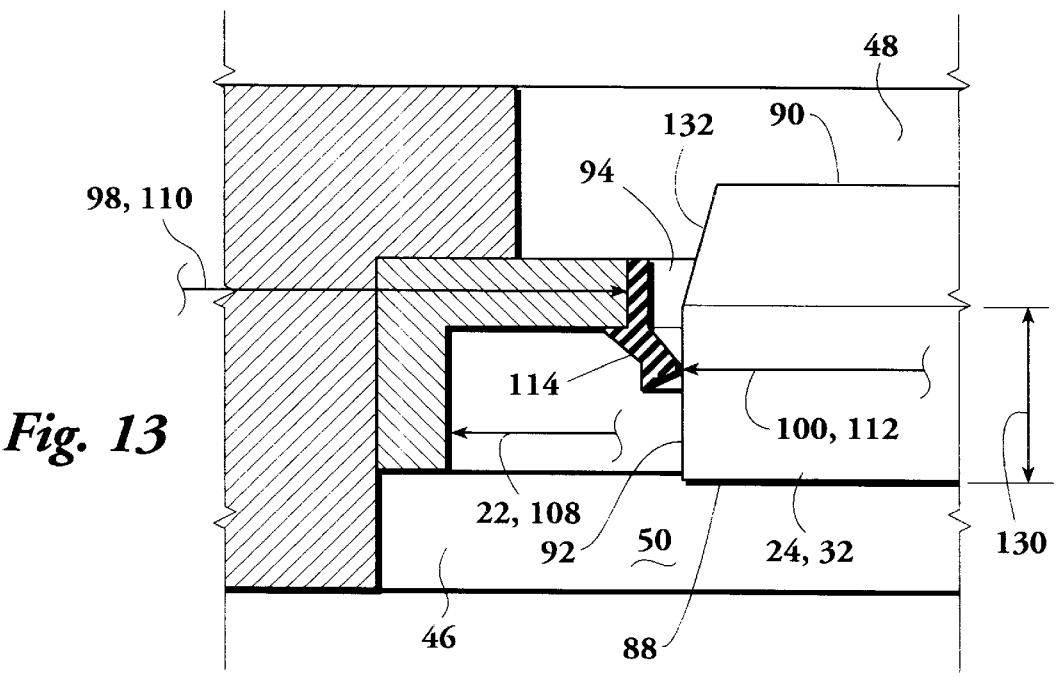
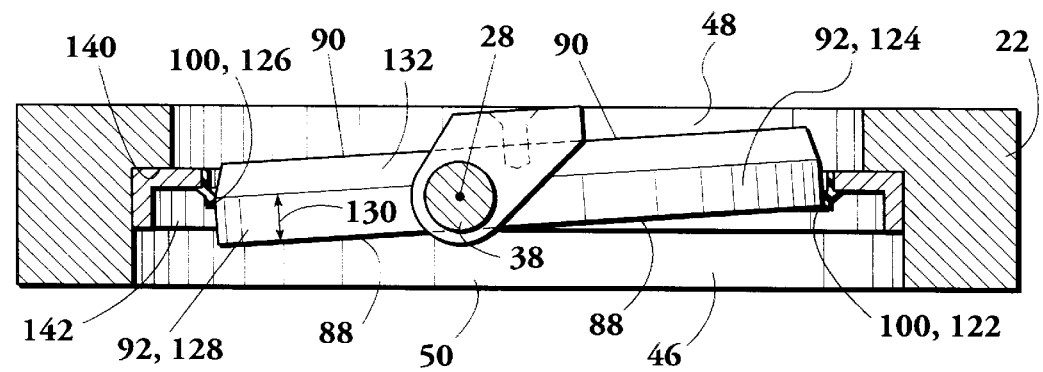
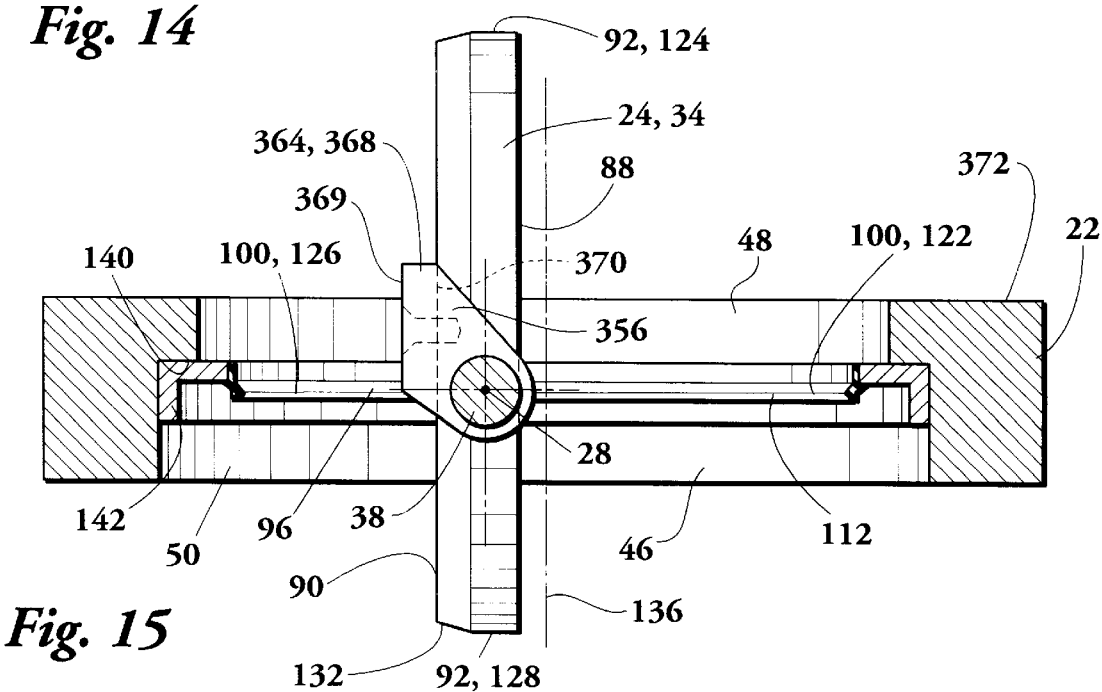

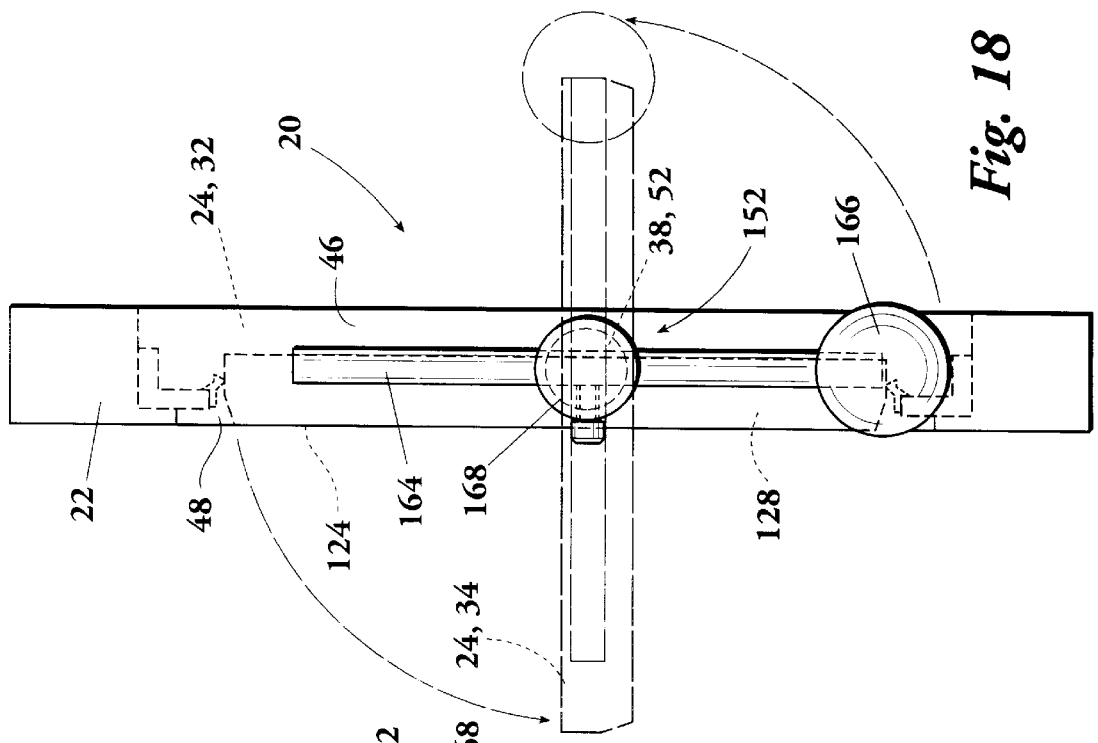
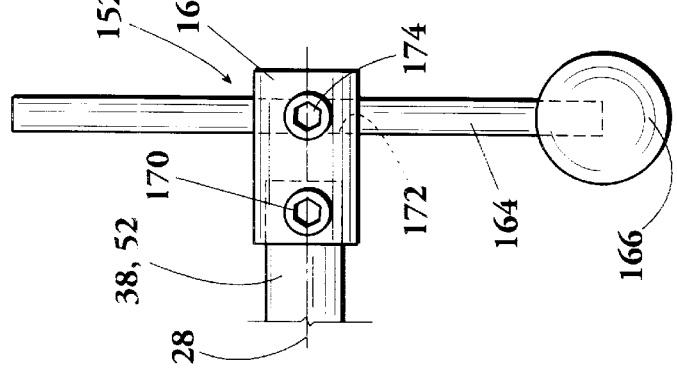
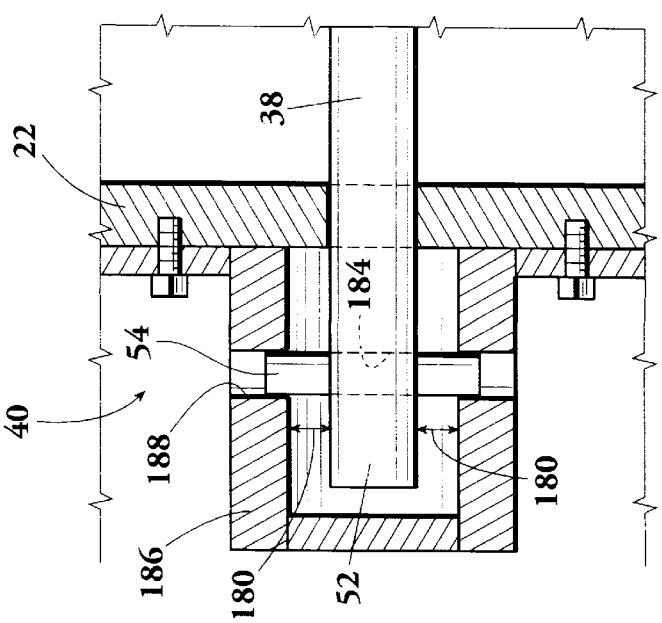

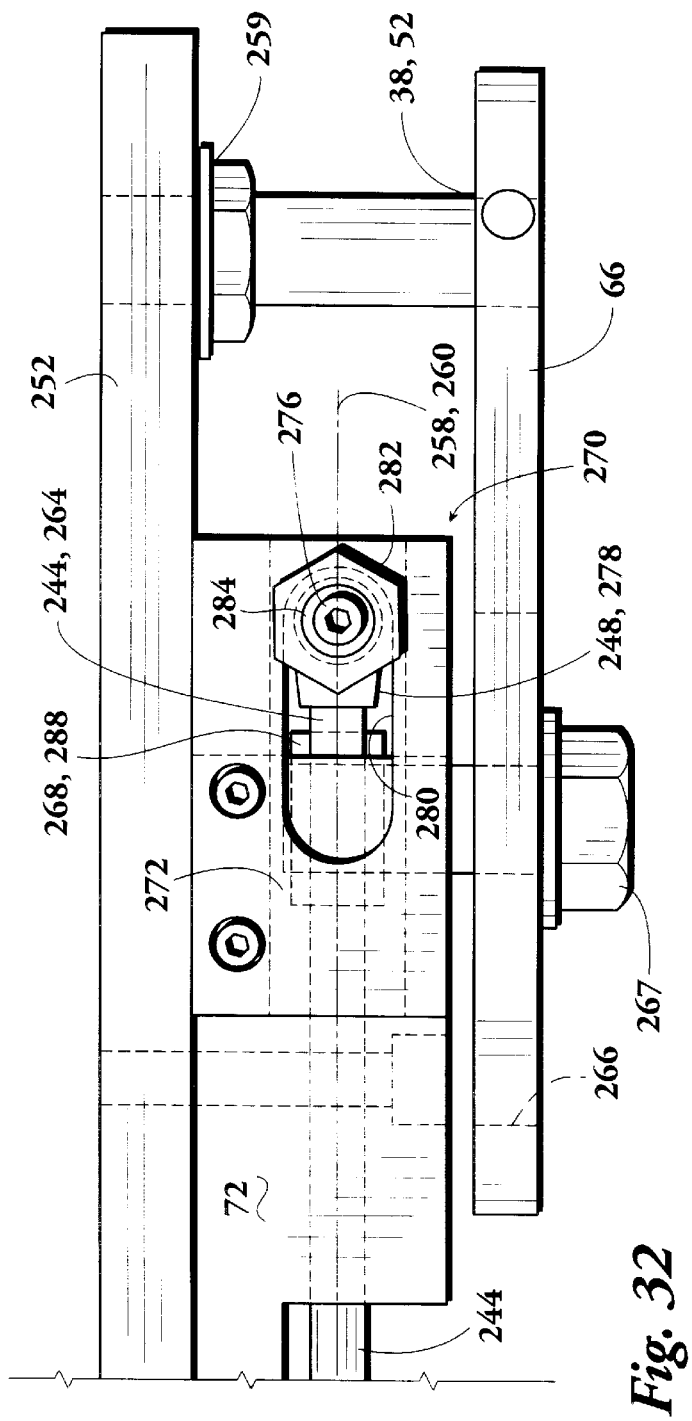
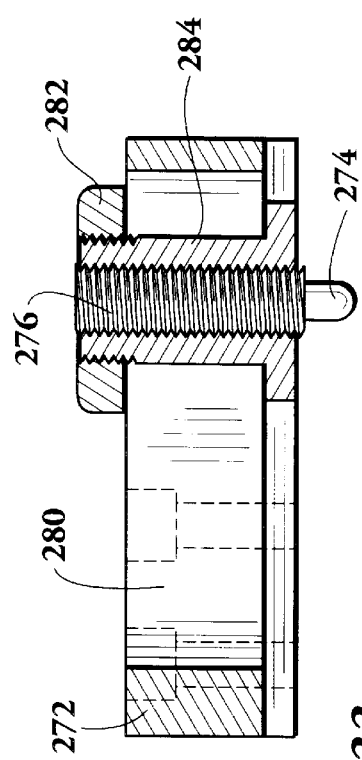
Fig. 32
Fig. 33

ROTATABLE VALVE ASSEMBLY

This is a divisional application of Ser. No. 08/706,174 filed Aug. 30, 1996, now U.S. Pat. No. 5,947,445.

BACKGROUND OF THE INVENTION

The present invention relates to rotatable valve assemblies and more particularly, but not by way of limitation, to a rotatable valve assembly which may be used as a pressure relieving device.

The use of various sorts of rupture disks and pressure relief valves to prevent overpressure of a fluid pressure containment structure are known. For example, U.S. Pat. No. 3,472,284 (Hosek) discloses a pressure seal in which disks 26, 32 rotate about offset shaft 24. A diaphragm 14 is clamped between the disks and housing to seal the assembly and the diaphragm is sheared by the rotation of the disks when a desired fluid pressure is present. In order to reseal the valve, the housing members 10, 12 must be opened and the valve taken out of service.

U.S. Pat. No. 3,039,482 (Goldberg) discloses a butterfly-type valve in which the longitudinal axis of the inlet and the longitudinal axis of the outlet are offset so that when the valve is forcibly oscillated and the hermetic sealing sheet 13 is sheared, the sealing ring 18 on the lower edge of the valve 16 will safely clear the rough and sharp sheared edge of sheet 13. The inlet and outlet body sections 11, 12 must be taken out of service and opened in order to reseal the valve after a pressure relieving event.

U.S. Pat. No. 2,304,491 (Allen) and U.S. Pat. No. 3,603,333 (Anderson) disclose traditional right-angle relief valves in which a shear pin is used to hold the valve in a closed, sealed position until a preselected pressure is experienced in the inlet to the valve. Upon overpressure, the valve shears the shear pin and is moved to an open, pressure relieving position. Since both of these valves use a shear pin, the tolerances between the member holding the shear pin stationary and the moving member which shears the shear pin are critical to provide a predictable relief pressure. For example, referring to the Allen patent, the diameter of the stem 8 and the internal diameter of the bushing 9 through which the pin 13 passes must be carefully matched to achieve an accurately predictable shear pressure. As the space or gap between the sides of the stem 8 and the internal diameter of the bushing 9 increases, the force required to shear the pin 13 diminishes rapidly. This requires precision machining and matching of the componentry that is difficult and expensive to repeatably produce and to maintain. Other shortcomings of the right-angle relief valves include the increased body size and the flow restriction created by the right angle turn in the flow passageway, as well as the tendency of the valve to flutter or chatter on the seat during pressure fluctuations because the valve must resist the entire fluid pressure exerted at the inlet, i.e., the shear pin and spring must directly resist the full force exerted on the face of the valve by the inlet pressure and directly absorb all pressure fluctuations.

U.S. Pat. Nos. 4,724,857, 4,787,409, 4,930,536, 4,977,918, 5,012,834, 5,067,511, 5,116,089, 5,146,942, 5,209,253, 5,226,442, 5,273,065, 5,297,575, 5,311,898, 5,318,060, 5,348,039, 5,373,864, and 5,433,239, all issued to Taylor, disclose pressure relief valves, emergency shutoff valves, vacuum/pressure release valves, and shutoff valves, which use a rupture or buckling pin which directly resists the substantially axial motion of a valve. The Taylor patents do not disclose the use of a rupture pin with a rotatable valve assembly, such as a butterfly valve, ball valve, plug valve, or the like; the use of a rupture pin which is not directly aligned with the motion of the valve; the use of a release means which increases the leverage the valve has on the buckling pin; or the use of a linearizing means to align the force the valve exerts with the axis of the buckling pin.

It is known to use rupture disks, such as reverse buckling rupture disks, to replace right-angle relief valves. Rupture disks have a lower cost per unit of capacity when compared to right-angle relief valves. However, rupture disks must be taken out of service to restore their pressure containing capability after a pressure relieving rupture. This requires either a redundancy (the use of multiple rupture disks in parallel), shutting down the system, or risking exposing the system to overpressure while the rupture disk is being replaced.

It is known to use rotatable valve assemblies, such as butterfly valves, ball valves, plug valves, and the like, to control or relieve fluid pressure in fluid containment systems. However, the prior rotatable valve assemblies known to the applicants typically require that the valve disk, ball, or plug, wipe or drag across a high friction, tight fitting seal made of elastomer or Teflon®; or use a seal which makes a "face" contact of substantial surface area around the valve. Therefore, a relatively high torque is required to open the prior valve assemblies, and this torque increases with time while the valve is in a closed position.

For example, Watts Regulator Company manufactures a Series QF Quarterflex butterfly valve which discloses a pressure assisted seat design. The line pressure exerts an upward force on the seat which forces the seat against the valve disk "accordion" style. The sealing surface of the seal is substantially in diametrical alignment with the seal seat which connects the seat to the retainer, i.e., there is a double fold in the seal which substantially aligns the seal seat and the sealing surface such that the sealing surface is not axially displaced from the seal seat. The sealing surface has a face of substantial axial dimension which creates a face seal of substantial surface area around the circumference of the disk. Such a face seal exerts substantially greater friction, requiring substantially greater torque to open and close, than the point or edge-type seal of the present invention. Watts' valve also uses a double offset shaft to reduce seat wear and enhance sealing by providing a camming action that is disclosed as lifting the disk off the seat.

U.S. patent application Ser. No. 08/519,653, which is assigned to the assignee of the present application, and which is incorporated herein by reference for purposes of disclosure, discloses a rotatable valve assembly which includes a seal which folds or bends about its rotational axis as the valve rotates from the closed to the open position. The seal has an endless protuberance which extends into a notch formed between the valve and housing in the closed position of the valve. Although the folding seal is a great improvement over prior devices, it requires between eight and thirteen foot pounds of torque to move the protuberance into and out of the notch as the valve closes and opens. The improved seal of the present invention reduces the torque required to open and close the valve to between one and three foot pounds.

There is a need for a valve assembly which will provide fluid pressure relief at an accurately predictable relief pressure and which may be returned to its pressure containing state after a pressure relieving event without taking the assembly out of service. There is also a need for a rotatable valve assembly which will reduce the frictional forces which must be overcome to rotate the valve between the open and closed position and in which the torque required to initiate rotation of the valve does not increase as the valve is left in a closed position for extended periods of time.

SUMMARY OF THE INVENTION

The present invention is contemplated to overcome the foregoing deficiencies and meet the above-described needs. In accomplishing this, the present invention provides a novel and improved rotatable valve assembly.

The invention is a rotatable valve assembly which includes a housing having an inlet and an outlet defining a fluid passageway through the housing; a valve located in the passageway which is rotatable between a closed position and an open position; mounting means for rotatably mounting the valve in the housing, the mounting means having a shaft with an outside end extending through the housing which is rotatable with the valve; conversion means for converting fluid pressure in the housing into torque exerted on the shaft; and release means located outside the housing for preventing rotation of the shaft and valve when the torque exerted on the shaft is below a selected magnitude and for releasing the shaft in order to allow rotation of the shaft and valve to the open position when the torque exerted on the shaft exceeds a selected magnitude. Linearizing means is provided for converting the forces exerted on the release means by the shaft into a linear force.

Preferably, the release means is a deformable means extending between the shaft and housing in order to prevent rotation of the shaft, the deformable means deforming or rupturing to allow rotation of the shaft and valve to the open position when the torque exerted on the shaft exceeds a selected magnitude. The deformable means may be a pin, beam, wire, or spring which ruptures, bends, buckles, or otherwise deforms to allow rotation of the shaft and valve. In another embodiment, the release means is a magnetic catch which prevents rotation of the shaft until the torque exerted on the shaft exceeds a selected magnitude.

A seal is provided for sealing the gap or space between the valve circumference and the fluid passageway in the closed position of the valve. The seal includes a support edge sealingly secured to the fluid passageway, a sealing edge extending inwardly from the support edge into contact with the valve circumference in the closed position of the valve, and a seal body connected between the support edge and the sealing edge and displacing the sealing edge axially towards the inlet face of the valve from the support edge. The preferred sealing edge makes a point contact or line contact of minimal axial dimension and minimal surface area around the valve circumference in the closed position of the valve in order to reduce the frictional forces exerted on the valve by the seal.

In a preferred embodiment, the rotational axis of the valve defines a first portion of the seal and sealing edge and a first portion of the valve and valve circumference on one side of the rotational axis, and a second portion of the seal and sealing edge and a second portion of the valve and valve circumference on the other side of the rotational axis. The first portion of the valve rotates into the outlet of the housing when the valve rotates from the closed to the open position. The axial dimension of the valve circumference in contact with the sealing edge in the closed position of the valve is constructed and arranged so that the first portion of the sealing edge breaks contact with the first portion of the valve circumference simultaneously with the second portion of the sealing edge breaking contact with the second portion of the valve circumference as the valve rotates from the closed position to the open position. The improved seal may be used independently of the features of the valve and independently of the conversion means and release means in virtually any rotatable valve assembly.

It is an advantage of the present invention to provide a rotatable valve assembly which will open at a predictable and repeatable torque magnitude, regardless of the length of time the valve has been in the closed position.

It is an advantage of the present invention to provide a seal for a rotatable valve assembly which allows the valve assembly to be opened at a predictable and repeatable torque magnitude.

It is an advantage of the present invention to provide a pressure relieving rotatable valve assembly which may be reset or restored to a pressure-containing condition without opening the assembly or taking the assembly out of service.

It is an advantage of the present invention to provide a pressure relieving rotatable valve assembly which will automatically reset to a pressure-containing condition without opening the assembly or taking the assembly out of service.

It is an advantage of the present invention to provide such a pressure relieving rotatable valve assembly which reduces the forces the valve must resist and transmit to remain closed.

It is an advantage of the present invention to provide such a pressure relieving rotatable valve assembly which will replace traditional relief valves at a substantial cost savings and using a smaller valve housing.

It is an advantage of the present invention to provide such a pressure relieving rotatable valve assembly in which a large diameter butterfly valve may be used in relatively high pressure applications and using a relatively small rupture pin or magnetic catch to determine the pressure at which the butterfly valve will open.

It is an advantage of the present invention to provide such an assembly which improves the ability of the rotatable valve to be repeatedly reset to the same relieving pressure.

It is an advantage of the present invention to provide such an assembly which allows the valve to be repeatably reset without replacement parts.

BRIEF DESCRIPTION OF THE DRAWINGS

The present invention will be better understood by reference to the example of the following drawings:

FIG. 3 is schematic end view of an embodiment of the invention.

FIG. 4 is schematic left side view of an embodiment of the release means of FIG. 2.

FIG. 5 is a schematic left side view of another embodiment of the release means of FIG. 2.

FIG. 6 is a schematic left side view of another embodiment of the release means of FIG. 2.

FIG. 7 is a schematic left side view of another embodiment of the release means of FIG. 2.

FIG. 13 is a replication of FIG. 10 used for additional description and explanation of the invention.

FIG. 14 is a view of FIG. .9 showing the valve just before the seal breaks contact with the valve.

FIG. 15 is a view of FIG. 9 showing the valve in the fully opened position.

FIG. 18 is a schematic side view of another embodiment of the reclosure means of the present invention.

FIG. 19 is a plan view of the reclosure means of FIG. 18.

FIG. 20 is an enlarged, top-sectional view of the release means of FIGS. 1 and 3.

FIG. 32 is a view along line 32—32 of FIG. 31.

FIG. 33 is an enlarged sectional view of an embodiment of the latch of the present invention.

DESCRIPTION OF THE PREFERRED EMBODIMENTS

Figure 1:
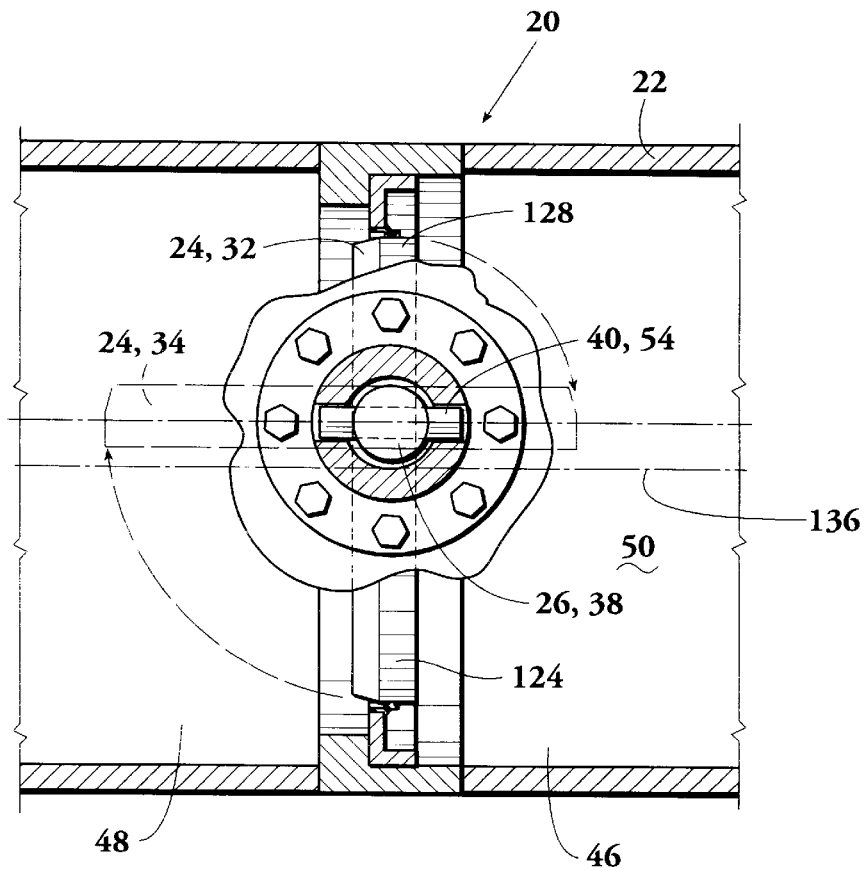
FIG. 1 is a view along line 1—1 of FIG. 3.

Preferred embodiments of the invention will now be described with reference to the drawings. Like reference numerals or characters refer to like or corresponding parts throughout the drawings and the description.

FIGS. 1–38 present embodiments of the rotatable valve assembly, generally designated 20, of the present invention. Although a preferred embodiment of the rotatable valve assembly 20, described herein to facilitate an enabling understanding of the invention, is used as a pressure relieving device which may be used to replace rupture disks, reverse buckling rupture disks, right angle relief valves, and the like, it is intended to be understood that the invention may be adapted to many fluid pressure and flow control applications, as would be known to one skilled in the art in view of the disclosure contained herein.

Figure 2:
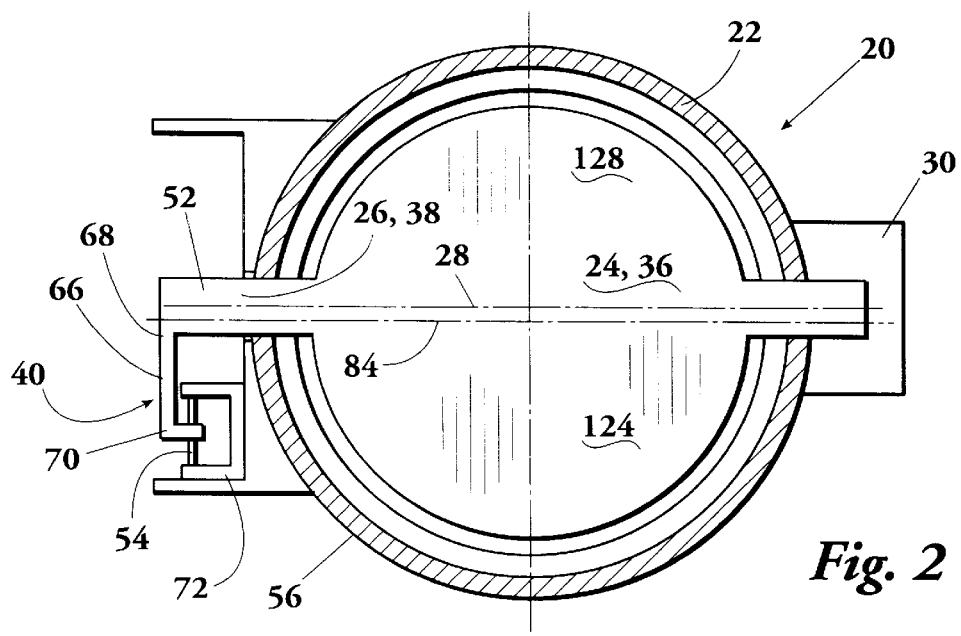
FIG. 2 is a schematic end view of an embodiment of the invention.

Referring to the example of FIGS. 1 and 2, the assembly 20 may be generally described as including a housing 22, a valve 24, mounting means 26 for rotatably mounting the valve 24 in the housing 22 about a rotational axis 28, and power means 30 for rotating the valve 24 between a closed position 32 and an open position 34. In the more preferred embodiments, the power means 30 comprises conversion means 36 for converting fluid pressure in the housing 22 into torque exerted on a shaft 38, and the assembly 20 includes release means 40 located outside the housing 22, for preventing rotation of the shaft 38 and valve 24 from the closed position when the torque exerted on the shaft 38 is below a selected magnitude and for releasing the shaft 38 in order to allow rotation of the shaft 38 and valve 24 to the open position 34 when the torque exerted on the shaft 38 exceeds a selected magnitude.

The housing 22 has an inlet 46 and an outlet 48 defining a fluid passageway 50 through the housing 22. The inlet 46 of the housing 22 receives fluid and pressure from a fluid pressure source (not illustrated), such as a vessel or piping. In the more preferred embodiments, the shaft 38 has an outside end 52 extending through the housing 22 and the shaft 38 is rotatable with the valve 24 about the rotational axis 28.

The preferred release means 40 includes deformable means 54 for making deformable contact between the housing 22 and the shaft 38. The deformable means 54 may be a pin, beam, bar, plate, disk, spring, or comparable rupturable or deformable structure. The deformable means 54 may be a permanently or irreversibly deformable structure, such as a pin or beam which bends or ruptures. In the prototype assembly 20, the deformable means 54 makes deformable contact between the outside 56 of the housing 22. and an outside end 52 of the shaft 38. By outside 56 of the housing 22 is meant an area of the housing 22, or connection therewith, which is not exposed to or in direct operating contact with the fluid contained inside the housing 22; and which may be accessed without opening the housing 22 and exposing the fluid contacting portions of the housing 22 to the outside atmosphere, and without taking the assembly 20 out of service.

Referring to the example of FIG. 3, in one embodiment the mounting means 26 includes a shaft 38 having a second outside end 58 extending through the housing 22; and the release means 40 includes a second deformable means 60 for making deformable contact between the housing 22 and the shaft 38, as previously discussed. The shaft 38 may be a single, continuous shaft extending across a face of or through the valve 24, or may be one or more shaft ends, axles, ears, or the like which extend from the valve 24 through the housing 22. Limit switches, motion detection switches, or the like may be provided at either or both outside ends 52, 58 of the shaft 38 to indicate whether the valve 24 is open or closed or has been opened or closed.

Referring to the example of FIG. 2, the deformable means includes a pin 54, connected between the shaft 38 and the housing 22, which breaks when the torque exerted on the shaft exceeds a selected magnitude. Referring to the example of FIG. 4, in another embodiment, the deformable means 54 includes a pin 54, connected between the housing 22 and the shaft 38, which bends when the torque exerted on the shaft 38 exceeds a selected magnitude. FIG. 4, also exemplifies a pin or spring 54 which is connected between the shaft 38 and housing 22 so that the pin 54 is placed in compression by the torque exerted on the shaft 38. Referring to the example of FIG. 5, the pin or spring 54 is connected between the shaft 38 and housing 22 so that the pin 54 is placed in tension by the torque exerted on the shaft 38. Referring to the example of FIG. 6, the pin 54 is connected between the shaft 38 and the housing 22 so that the pin 54 is subjected to shear forces by the torque exerted on the shaft 38.

FIGS. 2 and 4–7 are simplified, schematic illustrations of example embodiments of the release means 40. In the example of FIGS. 2 and 4–6, the release means 40 includes a contact arm 66 having a first end 68 connected to the outside end 52 of the shaft 38 and a second end 70 spaced away from the rotational axis 28 of the shaft 38; a release support 72 connected to the housing 22; and a pin or spring 54, connected to the release support 72 and obstructing rotation (clockwise in FIGS. 2 and 4–7) of the second end 70 of the contact arm 66. The pin or spring 54 obstructs or prevents rotation of the contact arm 66, shaft 38, and valve 24 from the closed position 32 of the valve until the torque exerted on the shaft 38 exceeds the selected magnitude. The dimension or distance that the second end 70 of the contact arm 66 is spaced or extended from the rotational axis 28 of the shaft 38 may be selected, in view of the torque exerted on the shaft 38, to adjust the leverage or mechanical advantage created by the distance between the rotational axis 28 of the shaft 38 and the second end 70 of contact arm 66, and to allow the use of a relatively small pin or spring 54. Depending upon the diameter of the shaft 38 and the torque exerted on and by the shaft, in some applications the second end 70 may be formed in or on the shaft (e.g., a socket for receiving the release means 40) with the contact arm 66 being the distance between the rotational axis 28 and the second end 70.

FIGS. 4–7 are simplified, schematic illustrations of additional example embodiments of the release means 40 as seen from the left side of FIG. 2. Referring to the example of FIG. 4, the pin or spring 54 is disposed on the release support 72 so that the pin is subjected to compressive forces by the second end 70 of the contact arm 66. This type of pin 54 is sometimes referred to as a buckling pin or, if it is a spring, a compression spring. The pin or spring 54 should be secured between the release support 72 and the second end 70 of the contact arm 66 so that the contact arm 66 holds the valve 24 solidly in the closed position 32. The pin 54 should also be secured so that when the pin 54 buckles (or the spring compresses), it does not interfere with the clockwise rotation of the contact arm 66 and valve 24 from the closed position to the open position. For example, in the embodiment of FIG. 4, the first end 62 of the pin or spring 54 may be fastened securely to the release support 72 with the second end 64 of the pin simply contacting the second end 70 of the contact arm 66 or being received in a recess 71 in the second end 70 of the contact arm 66 so that the second end 64 of the pin 54 is easily detached from connection with the contact arm 66 when the pin 54 buckles or bends.

Referring to the example of FIG. 5, the pin or spring 54 is connected between the release support 72 and the second end 70 of the contact arm 66 so that the pin is placed in tension by the contact arm 66. The tension pin 54 may be replaced by a tension wire or a tension spring. The preferred tension pin or spring 54 has a first end 62 which is secured, such as by clamps, bolts, screws, or the like to the release support 72 and a second end 64 which is secured, such as by clamps, bolts, screws, or the like to the contact arm 66. Alternatively, a perforation or hole may be made in the contact arm 66 and/or release support 72, the perforation being large enough to pass the tension pin 54 with the appropriate end(s) of the tension pin being enlarged or fastened so that it will not pass through the perforation when the pin is placed in tension. Referring to FIG. 5, as the valve and contact arm 66 attempt to rotate clockwise from the closed position to the open position, the pin or spring 54 is placed in tension until the torque exerted on the valve 24 and pin 54 exceeds the selected rupture pressure of the tension pin 54 or the restraining force of the tension spring. As in the other embodiments of the release means 40, the tension pin or spring 54 should be adjustably connected between the contact arm 66 and release support 72 in such a manner that the valve 24 is held securely in a closed position until the pin 54 ruptures or otherwise releases the valve 24.

Referring to the example of FIG. 6, in another embodiment, the pin 54 is disposed on the release support 72 so as to be subjected to shear forces by the second end 70 of the contact arm 66. In the example of FIG. 6, the shear pin 54 is securely fastened to the release support 72 and extends upwardly therefrom. The second end 70 of the contact arm 66 has an extension 73 which extends about perpendicularly from the contact arm 66 into contact with the pin 54 adjacent the connecting point of the pin 54 to the release support 72. The extension 73 exerts a shearing force (about perpendicular to the length of the pin) on the pin 54 at its connection to the release support 72. As in the other embodiments of the release means 40, the relative positioning of the shear pin 54 and contact arm extension 73 should be adjustable and adjusted to hold the valve 24 securely in the closed position until the torque exerted on the valve exceeds the selected magnitude at which the pin 54 should shear and the valve should open.

Referring to the example of FIG. 7, in another preferred embodiment, the release means 40 includes a magnetic catch 74. The magnetic catch 74 has a first magnetic element 76 located on the second end 70 of the contact arm 66 and a second magnetic element 78 located on the release support 72. The first and second magnetic elements 76, 78 are oriented so that their magnetic attraction holds the contact arm 66 and valve 24 in the closed position until the torque exerted on the valve 24 and shaft 38 exceeds the selected magnitude. The first and second magnetic elements 76, 78 may be permanent magnets or electromagnets, although permanent magnets are preferred. One of the first and second magnetic elements 76, 78 may be a non-magnetized material, such as a ferro-magnetic metal, which is attracted to the magnetization of the other elements 76, 78. As in the other embodiments of the release means 40, the location of the first and second magnetic elements 76, 78 should be adjustable so that the valve 24 is held securely in the closed position in order to prevent leakage of fluid around the valve and to prevent movement and/or chattering of the valve in the housing 22. The magnetic strengths of the magnetic elements 76, 78 should be selected to hold the valve in the closed position until the torque exerted on the valve 24, shaft 38, and contact arm 66 exceeds the selected magnitude. The magnetic catch 74 provides a repeatable release means 40 which allows the valve 24 to be restored to the closed position without replacement parts and which may be used many times without losing any accuracy in the amount of torque or fluid pressure required to move the valve 24 from the closed position to the open position.

Referring to the example of FIGS. 2 and 3, in the prototype assembly 20, which is a pressure relieving device, the conversion means 36 is provided by the valve 24 and the mounting means 26 is provided by the shaft 38. The preferred conversion means 36 applies greater force of the fluid pressure to the valve 24 on one side of the rotational axis 28 of the shaft 38. The conversion means 36 may be any valve placement, valve shape, valve seat shape or structure, housing shape or structure, fluid passageway 50 shape or structure, valve actuator, or the like, which applies the fluid pressure in the housing inlet 46 to the valve 24 in such a manner as to create a moment or torque about the rotational axis 28 of the valve 24 and/or shaft 38. In the prototype assembly 20, this is accomplished by using a butterfly or disk valve 24 and mounting the valve 24 for eccentric rotation in the passageway 50. The rotational axis 28 of the shaft 38 and valve 24 is offset from the diameter 84 of the valve 24. The first portion 124 of the valve 24 on the first side of the rotational axis 28 is larger and has greater area exposed to the inlet fluid pressure than the second portion 128 of the valve 24 on the second side of the rotational axis 28. This creates a moment and torque about the rotational axis 28 and shaft 38. This arrangement has another advantage in that the shaft 38 partially balances the fluid pressure on either side of the rotational axis 28 and shaft 38 and therefore reduces the pressure which the valve 24 must directly resist to seal, thereby reducing the chatter or simmer experienced in some types of pressure relieving valves, such as right angle relief valves.

Referring to example FIGS. 8–15, a more preferred embodiment of the rotatable valve assembly 20 will now be discussed. Referring to the example of FIGS. 8 and 9, the valve 24 has an inlet face 88, an outlet face 90, and a circumference 92 extending around the valve 24 between the inlet and outlet faces 88, 90. The inlet face 88 faces into the housing inlet 46 in the closed position 32 of the valve 24, the outlet face 90 faces into the housing outlet 48 in the closed position 32 of the valve 24, and the valve circumference 92 faces the surrounding or circumjacent fluid passageway 50 and defines a space or gap 94 (FIG. 10) between the valve circumference 92 and the fluid passageway 50 in the closed position 32 of the valve 24. The preferred gap 94 is annular and of relatively constant dimension (between the housing 22 and circumference 92). The dimension of the gap or space 94 may be of any magnitude which will allow the valve 24 to rotate in the housing 22 and fluid passageway 50 and accommodate the seal 96 described below, or other desired seal structures, as would be known to one skilled in the art in view of the disclosure contained herein.

Figure 10:
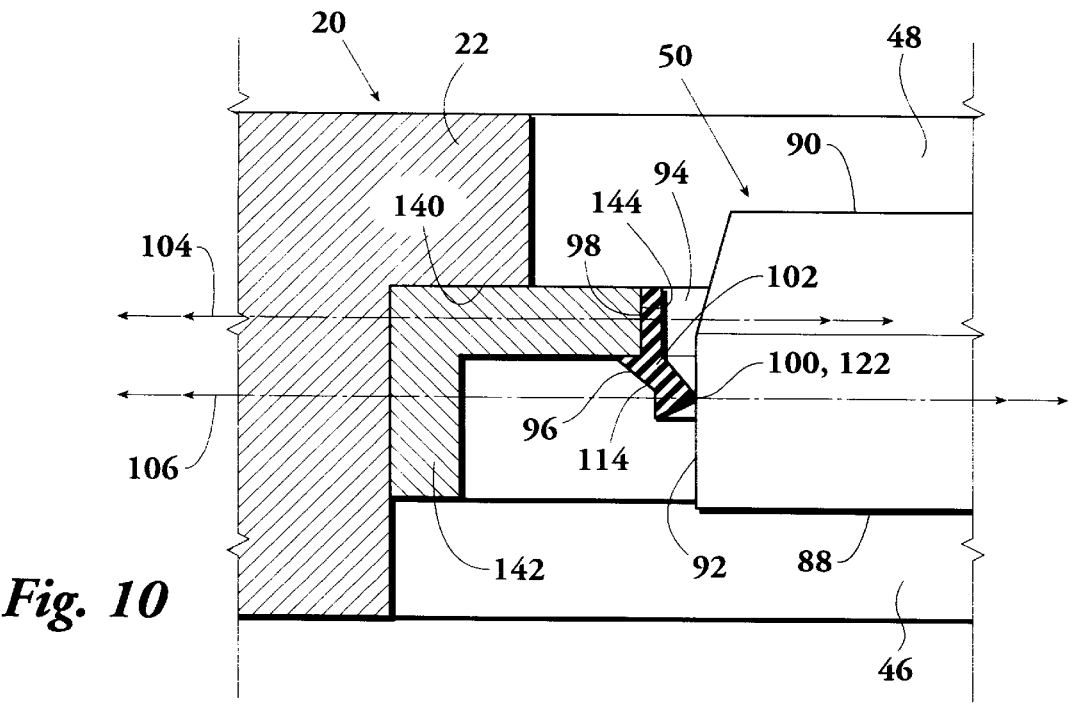
FIG. 10 is an enlarged detailed view of a portion of the seal with the valve in the closed position, as indicated on FIG. 9.
Figure 11:
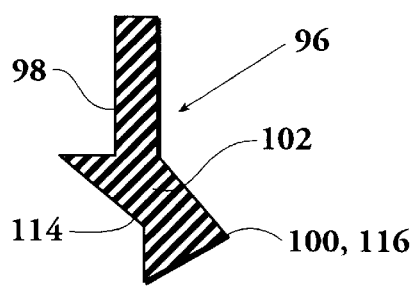
FIG. 11 is a cross-sectional view of the seal shown in FIG. 10.
Figure 12:
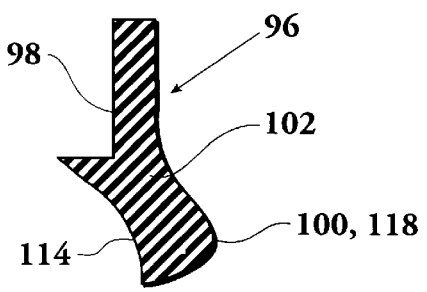
FIG. 12 is a cross-sectional view of another embodiment of the seal shown in FIG. 10.

Referring to example FIGS. 10–12, the assembly 20 includes a seal 96 for sealing the gap 94 between the valve circumference 92 and the fluid passageway 50 in the closed position of the valve 24. The preferred seal 96 includes a support edge 98 which is sealingly secured to the fluid passageway 50, a sealing edge 100 which extends inwardly into the fluid passageway 50 from the support edge 98 and into contact with the valve circumference 92 in the closed position 32 of the valve 24. A seal body 102 is connected between the support edge 98 and the sealing edge 100 and displaces the sealing edge 100 axially towards the inlet face 88 of the valve 24 and towards the housing inlet 46 from the support edge 98. The preferred seal 96 extends continuously around the fluid passageway 50.

Referring to example FIG. 10, the support edge 98 of the seal 96 defines a support edge plane 104 extending transversely across the fluid passageway 50 of the housing 22. The sealing edge 100 of the seal 96 defines a sealing edge plane 106 extending transversely across the fluid passageway 50 of the housing 22. The sealing edge plane 106 is spaced away from the support edge plane 104 towards the housing inlet 46 in order to increase the resilience of the sealing edge 100 and to enhance the ability of the sealing edge to seal against the circumference 92 of the valve 24, as will be further discussed below.

Referring to example FIG. 13, in the preferred assembly, the fluid passageway 50 of housing 22 has an inside diameter 108, the seal support edge 98 has an outside diameter 110, and the sealing edge 100 has an inside diameter 112. The inside diameter 108 of the housing 22 circumjacent, or in diametrical alignment, with the seal body 102 and sealing edge 100 is larger than the outside diameter 110 of the support edge 98 to allow fluid and fluid pressure entering the housing inlet 46 to have access to the outside diameter 114 of the seal body 102. The preferred housing inside diameter 108 should be sufficiently larger than the support edge outside diameter 110 that the ability of the seal body 102 and sealing edge 100 to flex or move radially is not impaired. When the valve is in the closed position 32, the fluid pressure in the housing inlet 46 will exert a radially inward force on the outside diameter 114 of the seal body 102 forcing the sealing edge 100 into virtually bubble-tight contact with the valve circumference 92. Normally, when the valve 24 is in the closed position 32, the pressure in the housing outlet 48 will be substantially lower than the pressure in the housing inlet 46 and the extension of the seal body 102 and sealing edge 100 away from the support edge 98 will allow the differential pressure between the inlet 46 and outlet 48 to act across the seal body 102 and force the sealing edge 100 into sealing engagement with the valve circumference 92.

Referring to the example of FIGS. 11–13, the preferred seal body 102 has an outside diameter 114 which is concave or otherwise recessed in radial cross section in order to increase the radial resilience of the seal and to enhance the ability of the seal 96 to use the inlet pressure and/or differential pressure across the valve 24 to force the sealing edge 100 into virtually bubble-tight engagement with the valve circumference 92.

Referring to the example of FIG. 12, the sealing edge 100 of the seal 96 has a convex protuberance 118 in radial cross section in order to make a point or line contact around the valve circumference 92 in the closed position of the valve and thereby reduce the surface area and the frictional forces exerted on the valve 24 and circumference 92 by the seal 96. The sealing edge 100 may have any protuberant shape in radial cross section which will minimize the axial dimension and the surface area of the contact between the sealing edge 100 and the valve circumference 92 while achieving an acceptable sealing function. More preferably, as exemplified in FIG. 11, the sealing edge 100 has a vertex 116 in radial cross section and the vertex 116 makes a point contact or line contact of minimal axial dimension around the valve circumference 92 in order to reduce the surface area and the frictional forces exerted on the valve 24 by the seal 96 and to thereby reduce the torque required to open and close the valve 24.

Referring to the example of FIGS. 13–15, the rotational axis 28 of the valve 24 defines a first portion 122 of the seal 96 and sealing edge 100 and a first portion 124 of the valve 24 and valve circumference 92 on one side of the rotational axis 28 and a second portion 126 of the seal 96 and sealing edge 100 and a second portion 128 of the valve 24 and valve circumference 92 on the other side of the rotational axis 28. As previously discussed, the first portion 124 of the valve 24 rotates into the outlet 48 of the housing 22 when the valve rotates from the closed position 32 to the open position 34. The axial dimension 130 of the valve circumference 92 in contact with the sealing edge 100 in the closed position 32 of the valve 24 defines a sealing surface, also designated 130, which is selected or sized so that the first portion 122 of the sealing edge 100 breaks contact with the first portion 124 of the valve circumference 92 and sealing surface 130 simultaneously with the second portion 126 of the sealing edge 100 breaking contact with the second portion 128 of the valve circumference 92 and sealing surface 130 (as illustrated in FIG. 14) as the valve 24 rotates from the closed position 32 to the open position 34. More specifically, the inside diameter 112 of the sealing edge 100 is selected or sized in conjunction with the selection of the axial dimension 130 of the valve circumference sealing surface 130 and the selection or sizing of the placement of the rotational axis 28 on the valve 24 so that the first and second portions 122, 126 of the sealing edge break contact with the first and second portions 124, 128 of the valve circumference sealing surface 130 simultaneously as the valve rotates from the closed position 32 to the open position 34. This simultaneous opening of both portions 124, 128 of the valve prevents the valve from hanging in a partially open position. If any portion of the valve circumference 92 breaks contact with the sealing edge 112 prior to the remainder of the valve circumference 92, the pressure in the housing inlet 46 may leak down before the release means 40 has an opportunity to fully release the valve 24 for rotation to the open position 34. For example, if the release means is a buckling pin 54, the premature opening of either portion 124, 128 of the valve 24 may cause the pin 54 to partially buckle. This can result in the valve being left in a partially open position with no external indication, thereby creating a potentially dangerous or hazardous situation.

In the prototype assembly 20, the sealing surface 130 has a constant and equal axial dimension on both portions 124, 128 of the valve and the sealing surface 130 is of constant outside diameter, i.e., the outside diameter of the sealing surface 130 is about parallel with the longitudinal axis 136 of the housing 22 and valve 24. The dimensions and shaping of the sealing surface 130 may be altered in conjunction with the placement of the rotational axis 28 on the valve 24 and the sizing and shaping of the inside diameter 112 of the sealing edge 100 to achieve other designs which facilitate the simultaneous opening of both portions 124, 128 of the valve 24, as would be known to one skilled in the art in view of the disclosure contained herein.

Referring to the example of FIGS. 14 and 15, in the preferred assembly, the second portion 128 of the valve circumference 92 has a bevel 132, or beveled portion 132, so that the valve circumference 92 at the outlet face 90 of the valve 24 is smaller than the remainder of the valve circumference 92, i.e., smaller than the sealing surface 130 of the valve circumference 92, and the outlet face 90 of the second portion 128 of the valve 24 does not contact the second portion 126 of the seal 96 as the valve 24 rotates from the open position 34 to the closed position 32. In other words, the beveled portion 132 has a large enough angle with respect to the longitudinal axis 136 of the housing that the inside diameter 112 of the sealing edge 100 is greater in dimension than the outside diameter of the outlet face 90 of the valve 24. Therefore, the outlet face 90 of the valve does not contact the second portion 126 of the seal and push it into the housing outlet 48 or otherwise deform the seal 96 as the valve 24 is returned from the open position 34 to the closed position 32. The beveled portion 132 should extend around the second portion 128 of the valve circumference 92 and beyond the antipodes of the rotational axis 28 of the valve 24. In the prototype valve 24, the beveled portion 132 extends entirely around the valve circumference 92.

Figure 9:
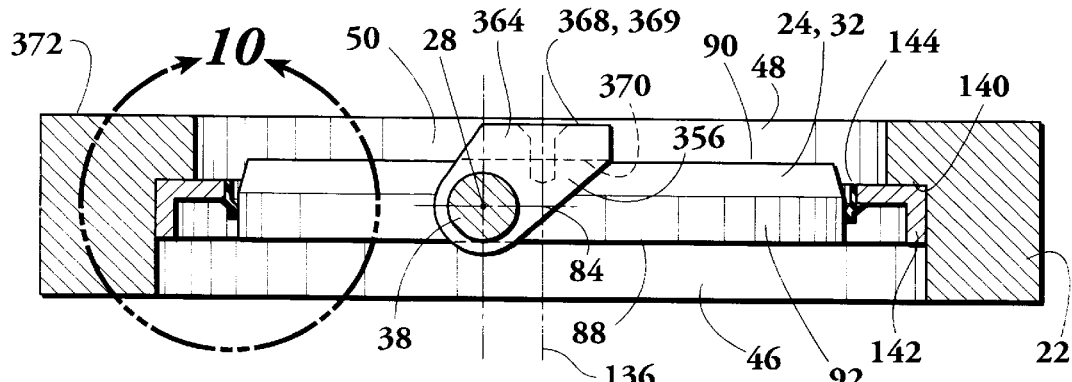
FIG. 9 is a view along line 9—9 of FIG. 8 reoriented 180°.

Referring to example FIGS. 9 and 10, the prototype housing has an inlet 46 of greater diameter than the outlet 48. The juncture of the housing inlet 46 and housing outlet 48 creates an annular ledge or seating surface 140 in the fluid passageway 50. The valve 24 is positioned so that it is in general diametrical alignment with the housing seating surface 140 in the closed position 32 of the valve 24. The prototype seal 96 includes an annular retainer 142 which extends outwardly from the seal support edge 98 for sealingly retaining the seal 96 in the fluid passageway 50. In the prototype assembly 20, the annular retainer 142 is made of a relatively rigid or stiff material and is press-fit or friction-fit against the housing seating surface 140. The prototype retainer 142 is generally L-shaped in radial cross section and is sized to allow unrestricted access of the inlet pressure to the outside diameter 114 of the seal body 102. In the seal exemplified in FIGS. 9–15, the support edge 98 of the seal 96 is adhesively bonded to the radial edge 144 (FIG. 10) of the retainer 142. Depending upon the service conditions, the retainer 142 may be made of carbon steel, stainless steel, or like materials. The preferred seal 96, seal body 102, and sealing edge 100 are made of a resilient polymer, plastic, or elastomer, such as Viton®. Rather than bonding the seal body 102 to the retainer 142, the retainer 142 may be completely encapsulated or coated by the seal 96, as would be known to one skilled in the art in view of the disclosure contained herein.

The use of the seal 96 discussed above creates a rotatable valve assembly 20 in which neither the housing 22 nor the valve 24 continuously wipes or drags against a large surface area of a seal as the valve is rotated. This greatly reduces the frictional forces which must be overcome to rotate the valve 24 and also creates a rotatable valve assembly 20 in which the torque required to initiate rotation of the valve assembly does not increase as the valve is left in a closed position for extended periods of time. The previously described seal 96 may be incorporated into virtually any type of rotatable valve assembly in which it is desired to reduce the frictional forces required to open, close, or rotate the valve; and may be used without the conversion means 36 and with the various known types of power means 30, such as manual, hydraulic, pneumatic, and electric valve actuators.

Referring to the example of FIGS. 16–19, the assembly 20 may also include reclosure means 152, located outside the housing 22, for returning the valve 24 to the closed position 32 after the valve 24 has been opened. The reclosure means 152 is particularly useful where the assembly 20 is used as a pressure relieving device, in that, after the excessive pressure has been relieved, the reclosure means 152 will automatically return the valve 24 to the closed position 32. It is contemplated that the assembly 20 and reclosure means 152 will be particularly useful with the release means 40 having a magnetic catch 74 (FIGS. 7, 25, and 37), in that the reclosure means 152 may automatically, without the aid of a human operator, reset the magnetic catch 74 and valve 24 to the closed position until another overpressure condition exerts torque about the rotational axis 28 and shaft 38 which exceeds the selected magnitude required to open the magnetic catch 74.

The reclosure means 152 may be any form of spring-loaded actuator, pneumatically-operated actuator, electrically-operated actuator, hydraulically-operated actuator, or weight-biased actuator. The strength of the reclosure means 152 should be selected, in view of the torque or fluid pressure at which the release means 40 is designed to allow the valve 24 to open, to reclose the valve 24 without interfering with the pressure relieving design or capability of the valve 24, as would be known to one skilled in the art in view of the disclosure contained herein. The reclosure means 152 may be located at the same shaft end 52, 58 as the release means 40 or at the opposite outside shaft end.

Figure 16:
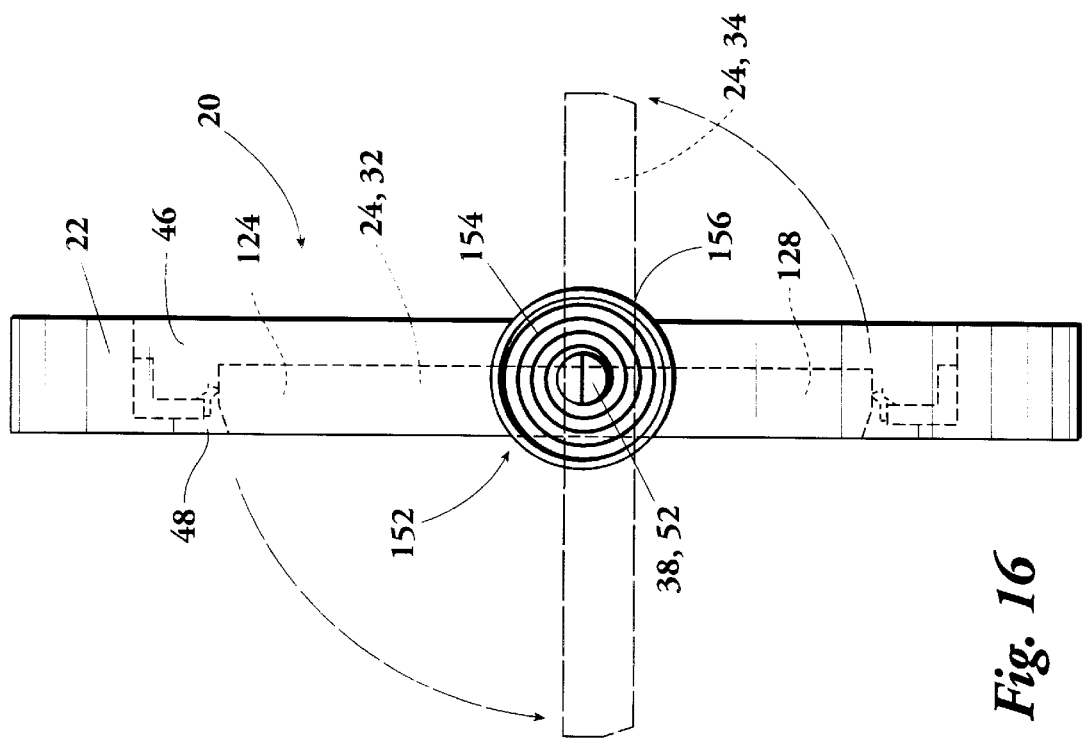
FIG. 16 is a schematic side view of an embodiment of the reclosure means of the invention.

Referring to the example of FIG. 16, in one embodiment, the reclosure means 152 comprises a torsion spring 154 connected between the outside end 52 of the shaft 38 and a torsion spring housing 156 connected to the outside of the housing 22 adjacent the shaft 38.

Figure 17:
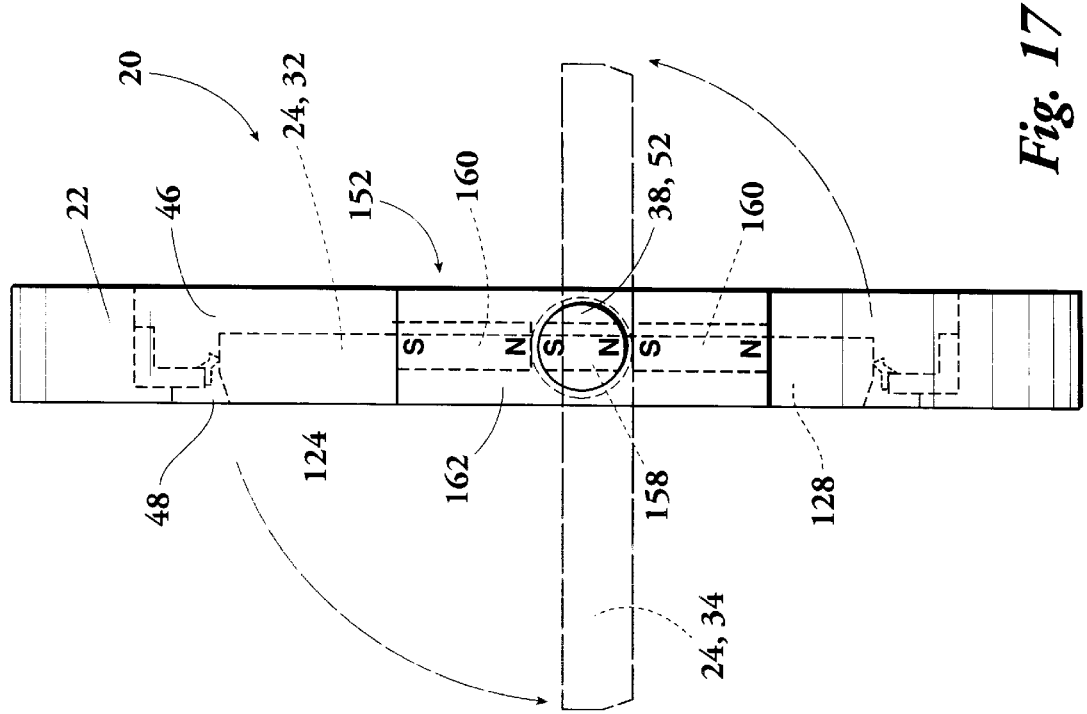
FIG. 17 is a schematic side view of another embodiment of the reclosure means of the present invention.

Referring to the example of FIG. 17, in another embodiment, the reclosure means 152 includes a first magnetic element 158 having north (N) and south (S) magnetic poles disposed in the outside end 52 of the shaft 38. A second magnetic element 160 having north (N) and south (S) magnetic poles is disposed in the housing 22 or in a magnet housing 162 extending from the outside of the housing 22 adjacent the shaft 38. The first and second magnetic elements may be electromagnets or the like, but are permanent magnets in the preferred embodiment. The first and second magnetic elements 158, 160 are oriented so that like magnetic poles of the first and second magnetic elements 158, 160 bias the shaft 38 and valve 24 from the open position 34 to the closed position 32 after the overpressure and torque forcing the valve 24 from the closed position to the open position has subsided.

Referring to the example of FIGS. 18 and 19, in another embodiment, the reclosure means 152 includes a reclosure arm 164 connected to and extending from the outside end 52 of the shaft 38. A counterweight 166 is connected to the reclosure arm 164 for urging the shaft 38 and valve 24 from the open position 34 to the closed position 32. Preferably, the reclosure arm 164 is connected to the outside end 52 of the shaft 38 with a counterweight housing 168. The preferred counterweight housing 168 is rotationally positionable on the shaft end 52. For example, as illustrated in FIG. 19, the counterweight housing 168 may be a cylindrically shaped extension which fits over the outside end 52 of the shaft 38 and has a set screw 170, or other fastening device, for selectably securing the position of the counterweight housing 168 on the shaft end 52. The set screw 170 may be loosened and the housing 168 rotated with respect to the shaft end 52 in order to adjust the orientation of the reclosure arm 164 and counterweight 166 with respect to the housing 22 and valve 24. The preferred reclosure arm 164 is adjustably connected to the counterweight housing 168 so that the distance from the rotational axis 28 of the shaft 38 to the counterweight 166 may be adjusted in order to adjust the magnitude of the force or torque the counterweight 166 exerts in biasing the valve 24 towards the closed position 32. In the example FIG. 19, the reclosure arm 164 extends through a slot or other transverse (to the rotational axis 28) passageway 172 through the housing 168 and a second set screw 174 is adjustably extendable through the housing 168 into contact with the reclosure arm 164 to secure the arm 164 in a selected position. Preferably, the counterweight 166 is detachable from the reclosure arm 164 so that various sizes or weights of counterweights 166 may be used to adjust the force or torque with which the reclosure arm 164 biases the valve 24 from the open position 34 towards the closed position 32.

Referring to the example of FIG. 20, in another embodiment, the release means 40 includes a pin or beam 54 connected between the shaft 38 and the housing 22 and having an unsupported area 180 extending between the shaft 38 and the housing 22. The unsupported area 180 reduces the torque or force magnitude required to deform or rupture the pin 54 to a magnitude below the torque or force magnitude required to shear the pin 54. It is contemplated that the predictability of the force required to rupture the pin 54 becomes more accurate or reliable as the length of the unsupported area 180 increases.

The pin 54 extends about diametrically through a hole 184 in the outside end 52 of the shaft 38. A support housing 186 is connected to the housing 22 around the outside end 52 of the shaft 38. The support housing 186 includes a slot or hole 188 which may be aligned with at least one end of the pin 54 so that an end of the pin 54 may be extended through both the shaft 38 and support housing 186 in order to lock or secure the valve 24 in the closed position 32. The pin 54 and the unsupported area 180 between the outside end of the shaft 38 and the adjacent support housing 186 should be selected or sized so that the pin 54 will rupture when a preselected magnitude of torque is applied to the valve 24 and shaft 38. The support housing 186 and pin 54 may be designed so that the pin 54 passes through the shaft and through the support housing 186 on both sides of the shaft 38, as illustrated in FIG. 20, if it is desired to increase the torque required to rupture the pin 54. Also, a second support housing 190 may be provided at the second outside end 58 of the shaft 38 and provision made for providing pins 54, 192 at both ends 52, 58 of the shaft 38 if it is desired to further increase the torque required the shaft 38 and valve 24 from the closed position 32 (FIG. 3). The relative positioning of the support housing(s) 186, 190 and slot(s) 184, 188 should be adjustable to ensure snug engagement of the pin 54 in the slot(s) and to thereby securely hold the valve 24 in the closed position 32 at torques below the desired rupture torque, as would be known to one skilled in the art in view of disclosure contained herein.

Figures 21, 22:
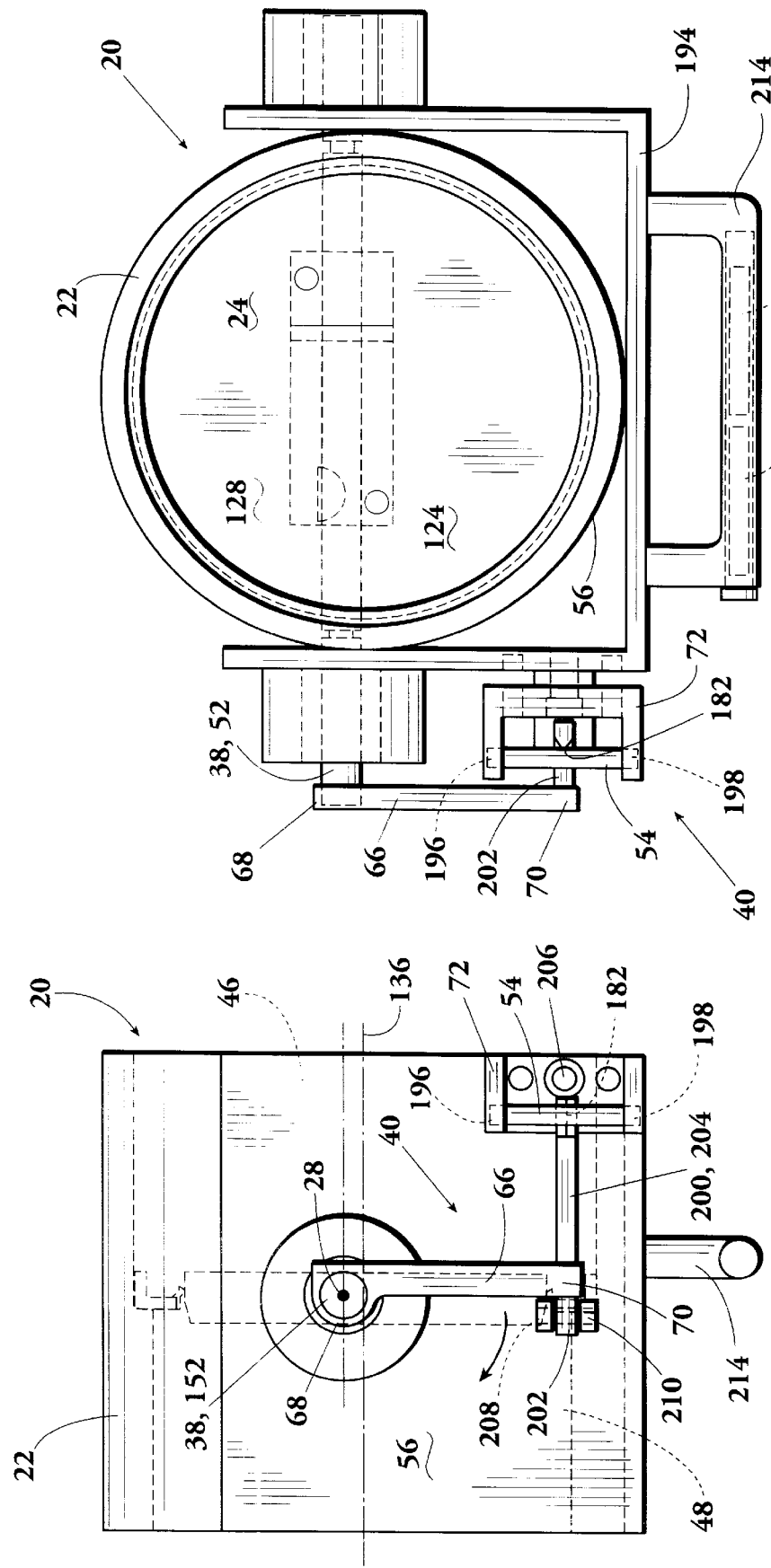
FIG. 21 is a side elevational view of another embodiment of the release means of the present invention.
FIG. 22 is an end elevational view of the release means of FIG. 21.

Referring to the example of FIGS. 21 and 22, in another prototype embodiment of the release means 40, the release support 72 includes a frame 194 connected to the outside 56 of the housing 22. A deformable or rupturable pin 54 is mounted on the release support 72 at a point spaced away from the rotational axis 28 of the shaft 38. A contact arm 66 has a first end 68 connected to the outside end 52 of the shaft 38 and a second end 70 which extends away from the shaft end 58 and contacts the pin 54 at a deformation initiation point 182. In the prototype assembly 20, the pin 54 is simply supported, i.e., the first and second ends 196, 198 of the pin 54 are supported with the deformation initiation point 182 and the remainder of the pin 54 being unsupported. The pin 54 and the distance between the supported ends 196, 198 of the pins should be selected or sized to rupture or deform when the selected torque exists on the shaft 38 and arm 66. The placement of the release support 72 and distance of the deformation initiation point 182 from the rotational axis 28, and the length of arm 60 may also be sized or selected in conjunction with the strength of the pin 54 to allow the valve 24 and shaft 38 to rotate when the fluid pressure exerts a predetermined magnitude of torque on the valve 24 and shaft 38. A second release support, second contact arm, etc. may be provided at the second outside end 58 of the shaft 28 (not illustrated) if desired or necessary for a specific application, as would be known to one skilled in the art in view of the disclosure contained herein.

Figure 23:
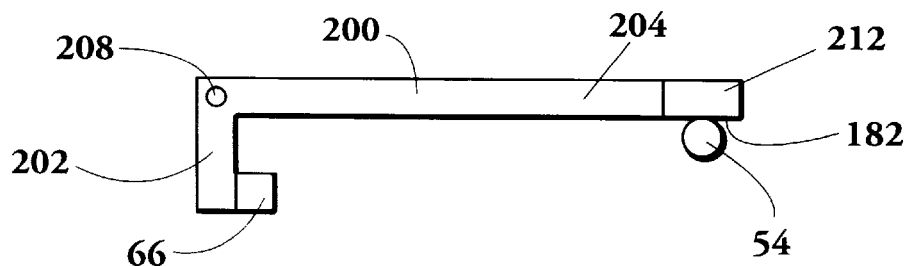
FIG. 23 is a top plan view of the lever arm of FIGS. 21 and 22.
Figure 24:
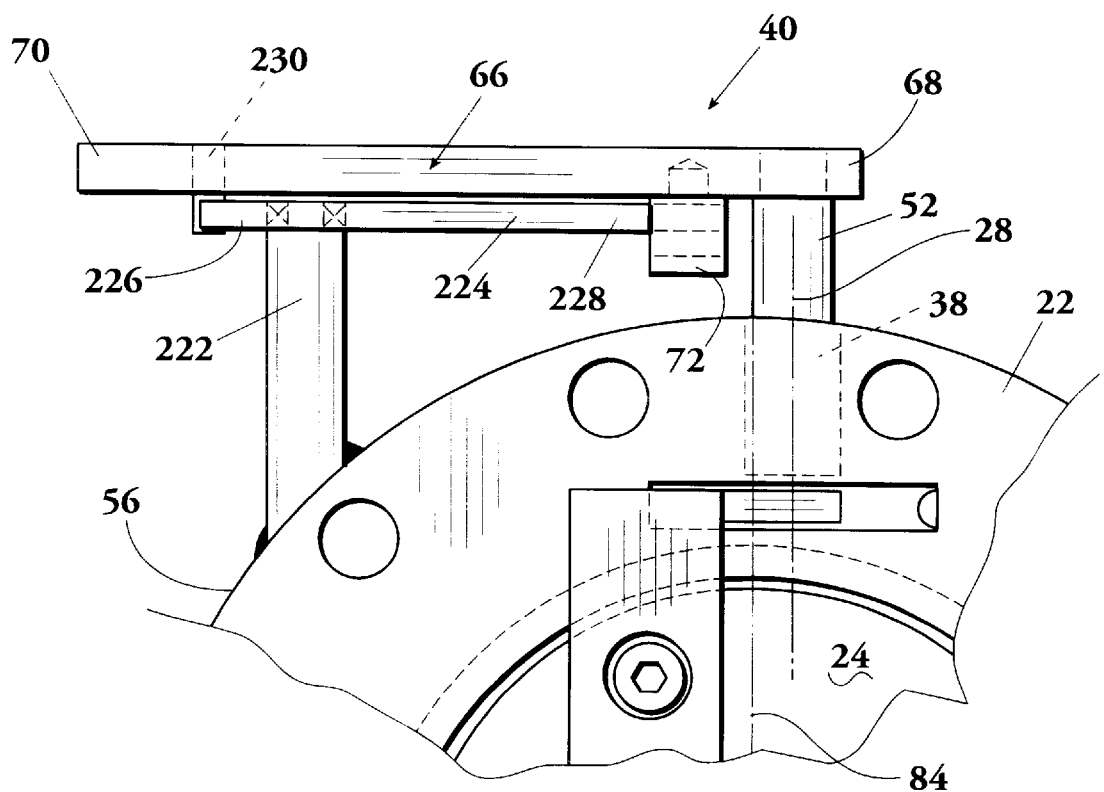
FIG. 24 is a front elevational view of another embodiment of the release means of the invention.

In another prototype embodiment of the release means 40, referring to the example of FIGS. 21–23, the second end 70 of the contact arm 66 contacts a lever arm 200 which extends between the contact arm 66 and pin 54 in order to further increase the mechanical advantage at the location of the pin 54 and reduce the strength of the pin 54 necessary to hold the valve 24 in the closed position 32. This is particularly useful when the assembly 20 is to be used in high pressure applications. Although the lever arm 200 may take various shapes and configurations to adapt to a specific situation, as will be known to one skilled in the art in view of the disclosure contained herein, and as further discussed below, in the prototype assembly 20 of FIGS. 21–23, the lever arm 200 is generally L-shaped. The lever arm 200 has a short leg 202 which contacts the arm 66 and a long leg 204 which extends perpendicularly from the short leg 202 into contact with the pin 54. The release support 72 includes a position adjustment mechanism 206, such as a set screw, threaded bolt, or the like, for adjusting the position of pin 54 and the engagement between the pin 54 and lever arm 200. The pin's position should be adjusted so that the valve 24 is held sealingly engaged with the housing 22 until the torque about shaft 38 exceeds the desired rupture torque at which the valve 24 is to open.

A hinge pin 208 extends through juncture of the short and long legs 202, 204 and creates an axis of rotation of the lever arm 200 which is about perpendicular to the plane of the lever arm 200. The hinge pin 208 has receptacle 210 (FIG. 21) which connects the hinge pin 208 to the outside of the housing 22. In the prototype lever arm 200, the free end 212 of the long leg 204 has a pointed, knife-like edge which contacts the pin 54 at the deformation initiation point 182 (FIG. 23). As previously mentioned, the pin 54 may be selected to rupture or to deform (i.e., bend) when subjected to a preselected force, thereby freeing the arm 66 and allowing the arm 66, shaft 38, and valve 24 to rotate to the open position 34 of the valve 24. In the prototype assembly 20, a handle 214 is provided for lifting or carrying the assembly 20, as the assembly 20 may be large and heavy. As indicated in FIG. 22, replacement pins 216 may be stored in the handle 214.

FIGS. 24–28 exemplify another preferred embodiment of the release means 40, which does not require a housing 22 as large as the previously discussed embodiments, particularly along the flow axis 136. In the embodiments of FIGS. 24–28, the contact arm 66 has a first end 68 connected to the outside end 52 of the shaft 38 and a second end 70 extending therefrom. The release means 40 includes stanchion 222 extending from the outside 56 of the housing 22. Lever arm 224 is pivotably connected to the stanchion 222 so that the lever arm 224 will pivot in a plane about parallel with the pivotal plane of the contact arm 66, the pivotal plane of the lever arm 224 being closer to the housing 22 so that the lever arm 224 is free to pivot between the contact arm 66 and the housing 22. The lever arm 224 has a first end 226 extending away from the stanchion and shaft 38 and a second end 228 extending from the stanchion 222 toward the shaft 38, the distance from the stanchion 222 to the second end 228 being greater than the distance to the first end 226. A post 230 extends from one of the second end 70 of the contact arm 66 or the first end 226 of the lever arm 224 into contact with the other (in the prototype assembly 20 the post is fixedly attached to the second end 70 of the contact arm 66). A release support 72 is connected to the housing 22 through the contact arm 66 and shaft 38, i.e., the release support 72 is connected to the contact arm 66 near the first end 68 of the contact arm 66 and between the shaft 38 and the stanchion 222, such that the release support 72 is in the rotational path of the second end 228 of the lever arm 224. As the shaft rotates, the post 230 moves the first end 226 of the lever arm 224, and the rotatable connection of the lever arm 224 to the stanchion 222 acts as a fulcrum in transmitting the motion of the post 230 and first end 226 to the second end 228 of the lever arm 224. The second end 228 of the lever arm 224 is in contact with a pin, spring, or magnet disposed on the release support 72 and which is selected in conjunction with the sizing of the contact arm 66 and lever arm 224 to restrain rotation of the shaft 38 until the torque about the rotational axis 28 and shaft 38 exceeds a selected magnitude. As in the embodiments of the release means 40 of FIGS. 2–7 and 20–22, in the embodiments of FIGS. 24–28, the various forms of the pin, spring, and magnet should be secured to the contact arm 66 and/or release support 72 so that the release means 40 does not interfere with the rotation of the contact arm 66, lever arm 224, and valve 24 from the closed position to the open position when the torque exerted on the shaft 38 and release means 40 exceeds the selected magnitude; and the relative positioning of the pin, spring, magnet, contact arm 66, and lever arm 224 should be adjustable and adjusted to hold the valve 24 securely in the closed position until the torque exerted on the shaft 38 exceeds the selected magnitude.

Figure 25:
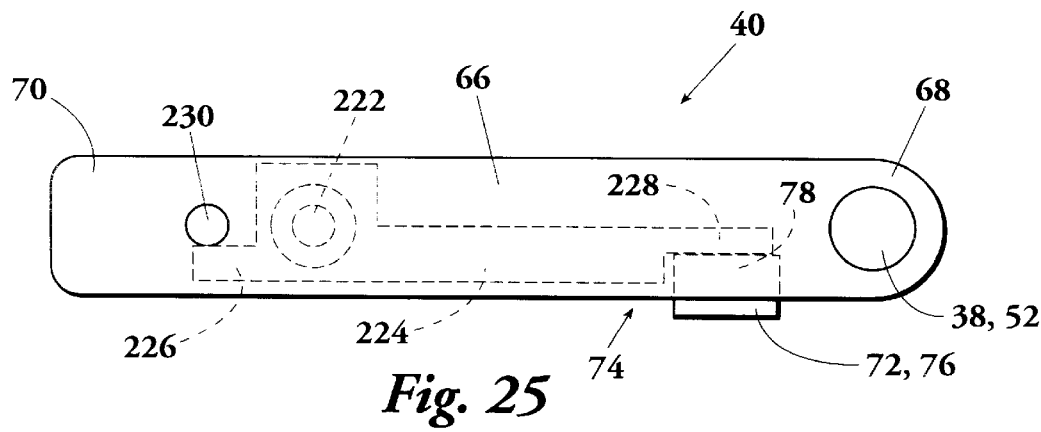
FIG. 25 is a top plan view of an embodiment of the release means of FIG. 24.

Referring to the example embodiment of FIG. 25, a first magnetic element 76 is connected to the release support 72 and a second magnetic element 78 is connected to the second 228 of the lever arm 224, the attraction of the magnetic elements preventing the second end 228 of the lever arm 224 from rotating (counterclockwise in FIG. 25) away from the release support 72 until the torque about shaft 38 (counterclockwise in FIG. 25) exceeds a preselected magnitude.

Figure 26:
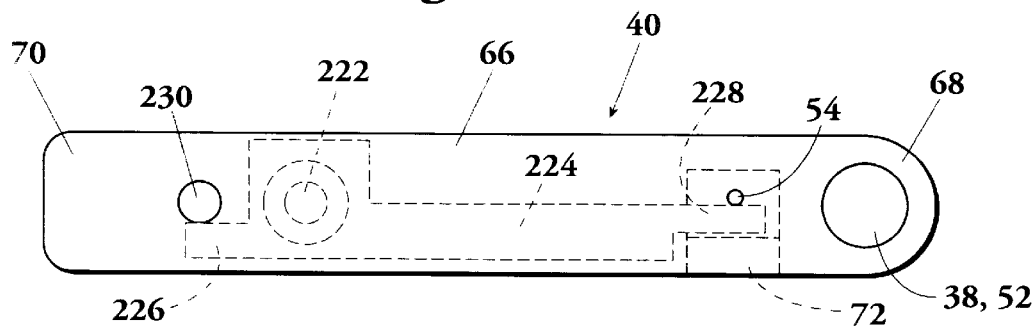
FIG. 26 is a top plan view of another embodiment of the release means of FIG. 24.

Referring to the example embodiment of FIG. 26, the release support 72 supports a pin 54 which prevents the second end 228 of the lever arm 224 from rotating (counterclockwise in FIG. 26) and allowing the shaft 38 to rotate (counterclockwise in FIG. 26) until the torque about the shaft 38 exceeds a preselected magnitude and breaks the pin 54. The pin 54 may be simply supported or cantilevered on the release support 72. If the pin 54 is cantilevered, the release support 72 may be eliminated by cantilevering the pin 54 from the contact arm 66 into obstruction with the second end 228 of the lever arm 224, as indicated by the solid line drawing of the pin 54 in FIG. 26.

Figure 27:
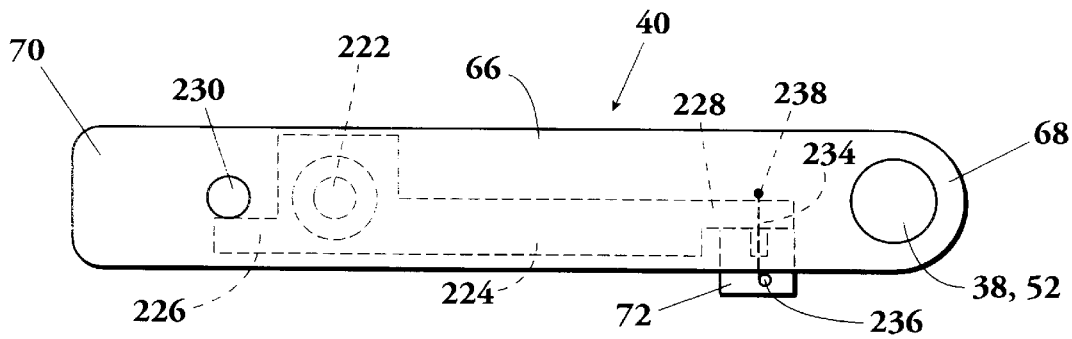
FIG. 27 is top plan view of another embodiment of the release means of FIG. 24.

Referring to the example embodiment of FIG. 27, a tension pin or wire 234 has a first end 236 connected to the release support 72 and a second end 238 connected to the second end 228 of the lever arm 224 such that rotation of the shaft 38 (counterclockwise in FIG. 27) is restrained by the tensile strength of the tension pin 234 until the torque about the shaft 38 exceeds the tensile strength of the wire 234 and breaks the wire 234. The tension pin 234 may be replaced with a tension spring 234, as would be known to one skilled in the art in view of the disclosure contained herein. The tension spring 234 would have the advantage of automatically and repeatably restoring the valve 24 to the closed position without replacement parts.

Figure 28:
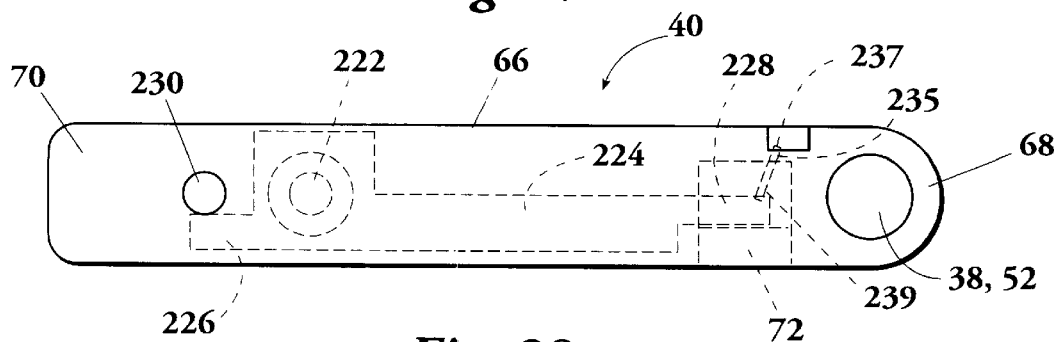
FIG. 28 is a top plan view of another embodiment of the release means of FIG. 24.

Referring to the example of FIG. 28, a buckling pin 235 has a first end 237 connected to the release support 72 and a second end 239 connected to the second end 228 of the lever arm 224 such that any rotation of the shaft 38 and valve 24 toward the open position 34 (counterclockwise in FIG. 28) places the buckling pin 235 in compression. The compressive strength of the buckling pin 235 is selected to resist the rotation of the shaft 28 until the torque exceeds the selected magnitude and buckles or bends the pin 235. The buckling pin 235 may be replaced with a compression spring, as would be known to one skilled in the art in view of the disclosure contained herein. The compression spring 235 would have the advantage of repeatably restoring the valve 24 to the closed position without replacement parts.

FIGS. 29–38 exemplify an embodiment of the assembly 20 which includes linearizing means 240 for converting the forces exerted on the release means 40 or deformable means 54 by the shaft 38 into a substantially linear force. The linearizing means may be used with any of the various types of release means 40 previously described and may be used with or without the improved valve 24, seal 96, and reclosure means 152 of the present invention.

Referring to the example of FIGS. 29–32, the prototype linearizing means 240 is supported by release support 72. The release support 72 may be directly connected to the housing 22, although in the prototype linearizing means 240, the release support 72 is mounted in a control box 242, which is connected to the housing 22, as would be known to one skilled in the art in view of the disclosure contained herein. Contact arm 66 has a first end 68 connected to the outside end 52 of shaft 38 and a second end 70 extending or spaced away from the rotational axis 28 of the shaft 38, as previously discussed. The preferred linearizing means 240 includes a piston 244 which is slidably mounted on the release support 72 between the release means 40 and the second end 70 of the contact arm 66. The piston has a first end 246 for contacting the release means 40 and a second end 248 for contacting the second end 70 of the contact arm 66. The linearizing means 240 includes a passageway 250, formed or located on the release support 72, for slidably retaining the piston 244.

The linearizing means 240 and release support 72 should be designed so that their alignment and positioning relative to the contact arm may be adjusted, as would be known to one skilled in the art in view of the disclosure contain herein. In the prototype assembly 20, the release support 72 is adjustably mounted on back plate 252, which is mounted in control box 242. Back plate 252 has alignment slots 254 and alignment bolts, set screws, or other adjustable fasteners 256 which may be used in conjunction with the slots 254 to align the passageway 250 so that the longitudinal axis 258 of the passageway 250 lies on a tangent of the rotational arc of the second end 70 of the contact arm 66; and to thereby align the longitudinal axis 260 of the piston 244 with a tangent of the rotational arc of the second end 70 of the contact arm 66. Alignment slot 257 is provided in the back plate 252 for adjustably receiving the outside end 52 of the shaft 38. An appropriate fastening device 259, such as a locking nut (best seen in FIG. 32) is provided for securing the position of the shaft end 52 in slot 257, as well as assisting in securing the back plate 252 in the control box 242.

Alignment slot 266 is also provided in the contact arm 66. Alignment slot 266 receives a lock nut 267 or equivalent adjustable fastener and contact member 268 (best seen in FIG. 32) which contacts the second end 248 of the piston 244. The point of contact between contact member 268 and piston second end 248 defines the tangent of the rotational arc of the contact arm 66 along which the axes 258, 260 of the piston 244 and passageway 250 are aligned. Therefore, the lock nut 267 and contact member 268 may be adjustably positioned in alignment slot 266 to adjust the placement of the rotational arc and tangent and to vary the leverage or mechanical advantage which the contact arm 66 provides. Proper tangential alignment of the longitudinal axis 260 of the piston 244 converts the rotational motion of the second end 70 of the contact arm 66 to a virtually pure linear motion of the piston 244.

Figure 29:
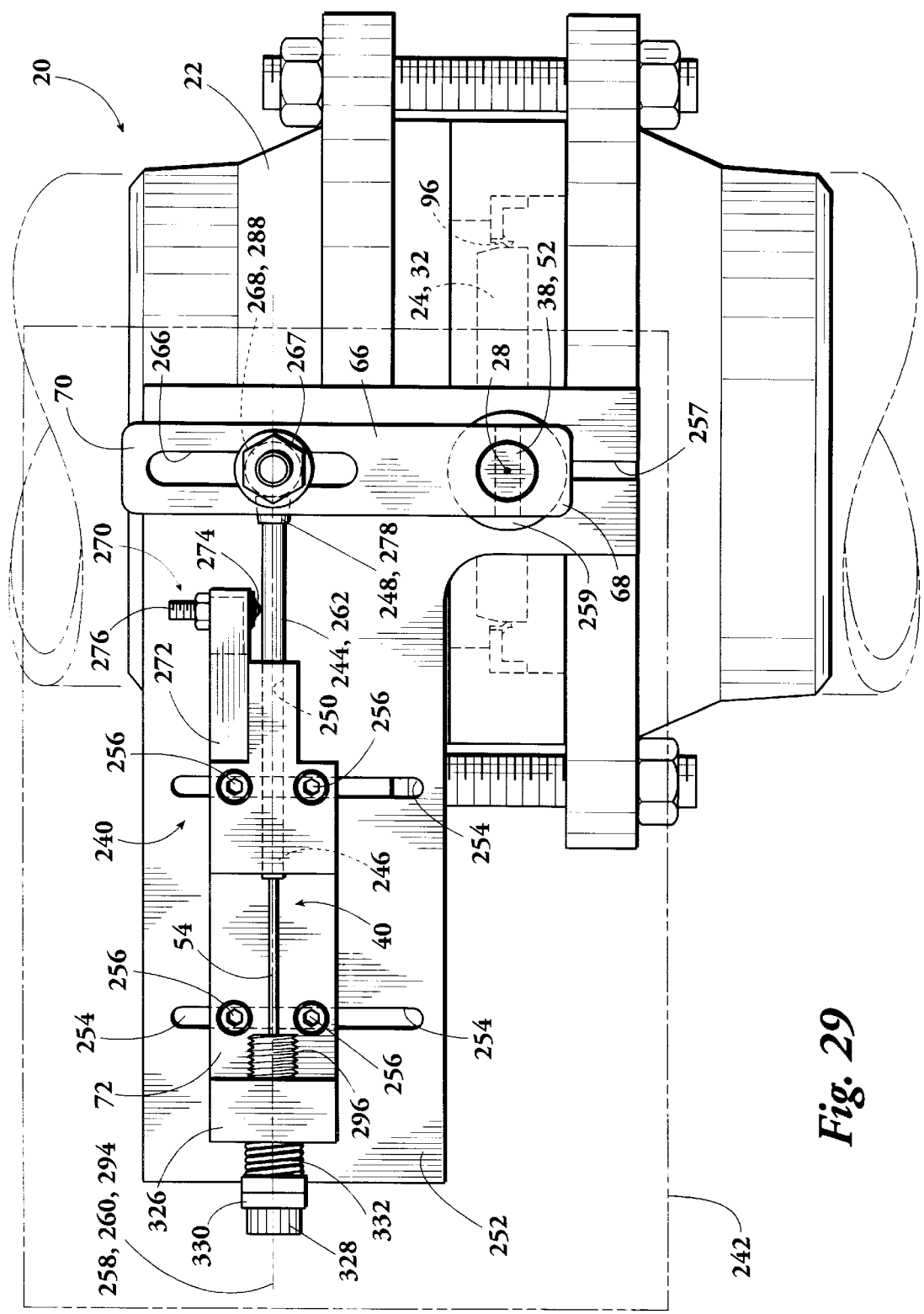
FIG. 29 is a front elevational view of an embodiment of the release means and linearizing means of the present invention mounted on the rotating valve assembly of the present invention.
Figure 30:
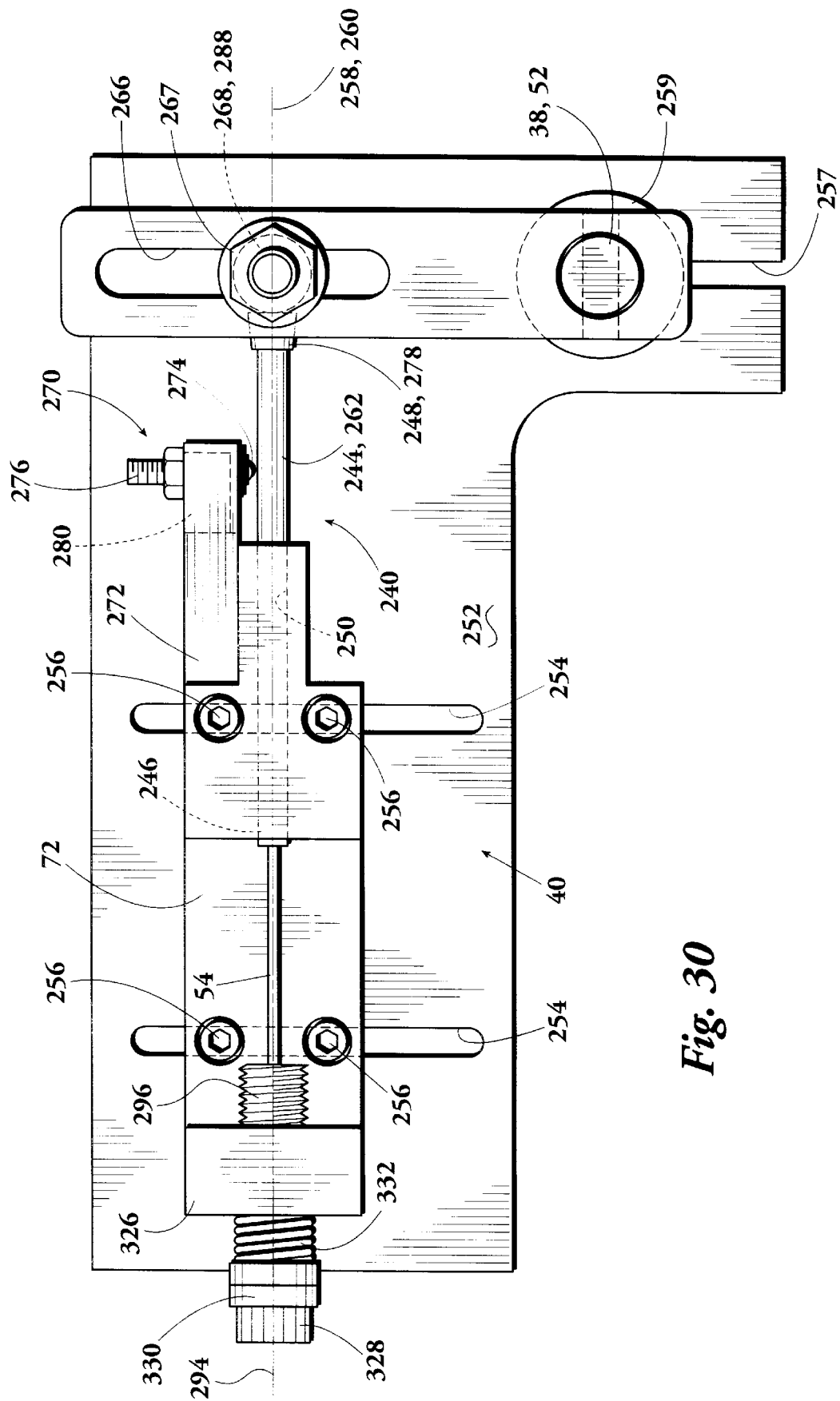
FIG. 30 is an enlarged front elevational view of the release means and linearizing means of FIG. 29 showing the release means holding the valve in the closed position.
Figure 31:
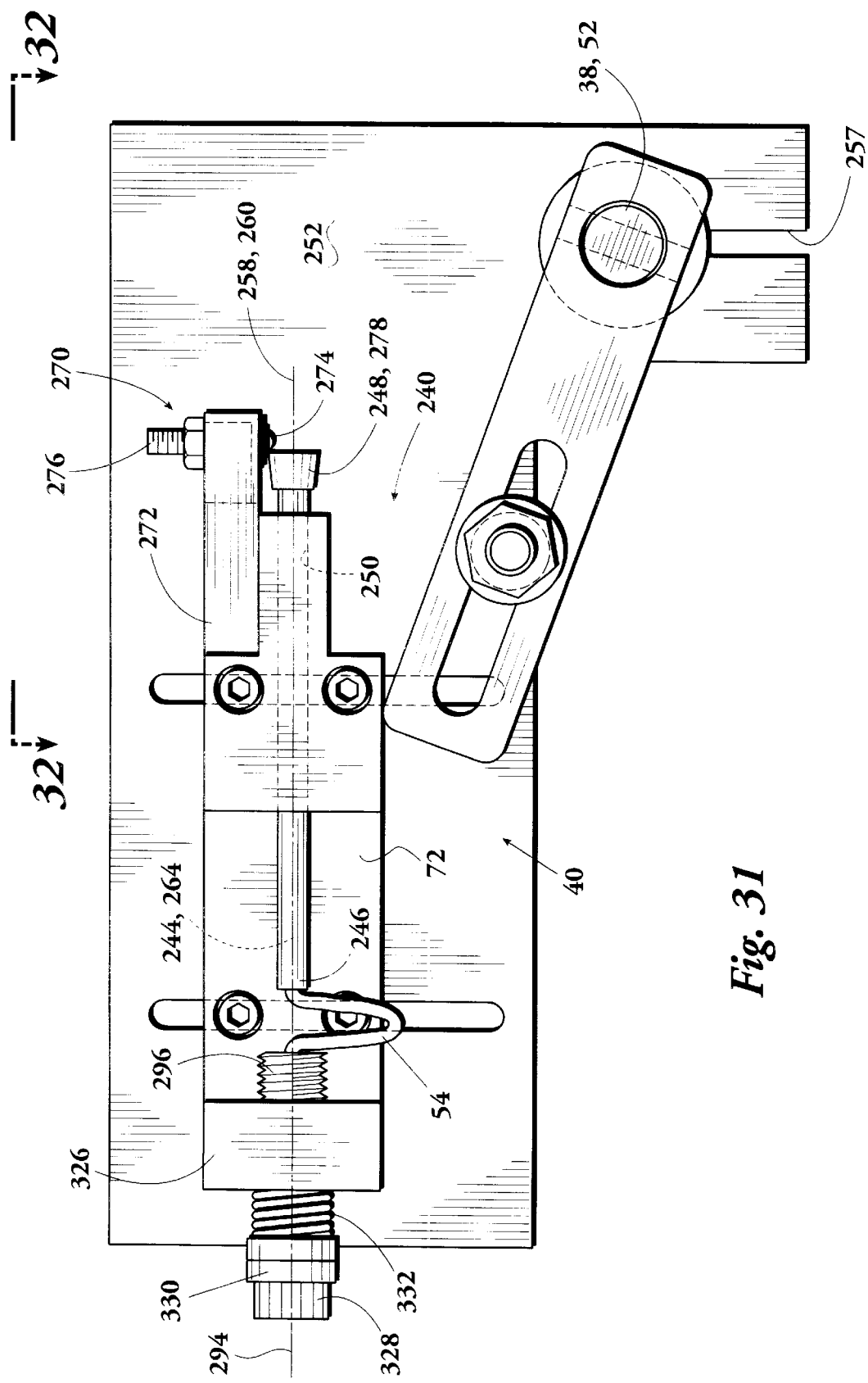
FIG. 31 is a view of FIG. 30 showing the release means in the ruptured or buckled position after a pressure-relieving event has occurred and the valve has moved to the open position.

Referring to the example of FIGS. 29–32, the piston 244 is slidable between an extended position 262 (FIGS. 29 and 30) when the valve 24 is in the closed position 32 and a retracted position 264 (FIGS. 31 and 32) when the valve 24 is in the open position 34. When in the extended position 262, the piston 244 holds the valve 24 in the closed position 32. When the torque exerted on the shaft 38 exceeds the selected magnitude, the release means 40 releases the piston 244 and allows it to move from the extended position 262 to the retracted position 264. In order to prevent the piston 244 from rebounding from the retracted position 264 to the extended position 262 after a pressure-relieving event, the release support 72 includes a latch 270 having a first end 272 connected to the release support 72 and a second end 274 disposed between the second end 248 of the piston and the release means 40 when the valve 24 is in the closed position 32 and the piston 244 is in the extended position 262. The latch 270 includes bias means 276 for biasing the second end 274 of the latch 270 into a position obstructing movement of the piston 244 towards the extended position 262 when the piston 244 is in the retracted position 264. The bias means 276 may be provided by virtually any known mechanical biasing apparatus, such as by pivotably connecting the first end 272 to the release support and weighting the second end 274 to bias the second end 274 into the obstructing or latching position. In the prototype assembly 20, the bias means 276 includes a spring which biases the second end 274 of the latch 270 into the latching position. The second end 248 of the piston 244 includes a camming surface 278 which is larger at the free end of the second end 248 of the piston 244 and reduces or converges towards the first end 246 of the piston 244 such that the camming surface 278 depresses or moves the latch second end 274 as the piston moves from the extended position 262 to the retracted position 264, allowing the piston to move into the retracted position 264. Once the piston 244 and camming surface 278 are in the retracted position, as illustrated in FIG. 31, the latch second end 274 prevents the piston 244 from returning to the extended position until the latch second end 274 is manually depressed and the piston 244 is moved to the extended position 262.

As illustrated in FIGS. 32 and 33, the preferred bias means 276 is a commercially available spring-loaded plunger unit, the plunger serving as the latch second end 274. The preferred bias means 276 is adjustably mounted in latch slot 280 with a jam nut 282 so that the position of the plunger 274 may be adjusted along the piston axis 260. The spring-loaded plunger is threaded into a retainer 284 which threads into the jam nut 282 so that the extension of the plunger 274 perpendicularly toward and away from the piston axis 260 may be adjusted and fixed where desired. The sides of the retainer 284 which face the sides of slot 280 are shaped to allow the retainer to move along the axis of the slot (and piston axis 260) while preventing the retainer from rotating in the slot 280 with the jam nut 282. In the prototype, the sides of the retainer 284 within the slot 280 are flattened and generally parallel to the axis of the slot 280 and piston axis 260.

Referring to the example of FIG. 32, the preferred linearizing means 240 includes a roller bearing 288, connected to either the second end 70 of the contact arm 66 or the second end 248 of the piston 244 for rollingly transferring the force of the second end 70 of the contact arm 66 through the piston 244 to the release means 40. More preferably, the roller bearing 288 is adjustably connected to the second end 70 of the contact arm 66 with locknut 267, as exemplified in FIG. 32 and replaces the previously discussed contact member 268. The roller bearing 288 prevents the second end 70 of the contact arm 66 from transferring non-tangential forces to the piston 244, or to the release means 40 if the roller bearing 288 is in direct contact with the release means 40 (such as if the second end 64 of pin 54 were extended through passageway 250 into contact with the roller bearing 288).

Figure 34:
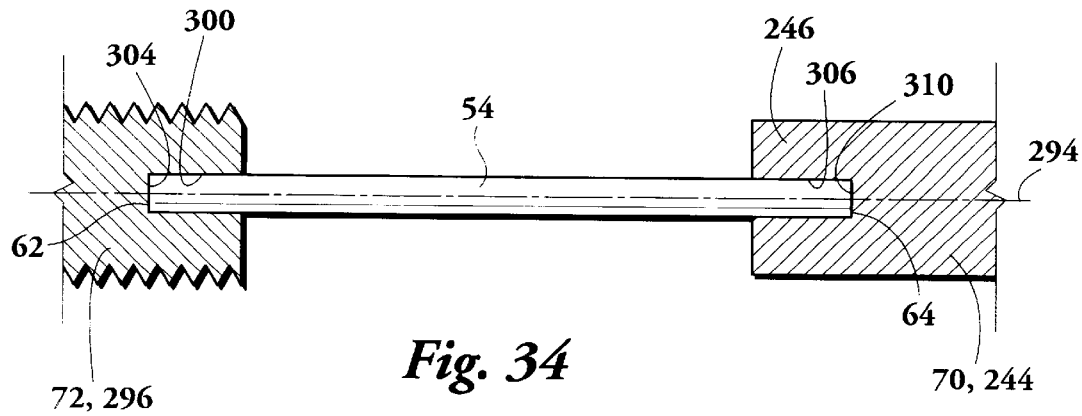
FIG. 34 is an enlarged view of the buckling pin of FIGS. 29–31 and its end connections.
Figure 35:
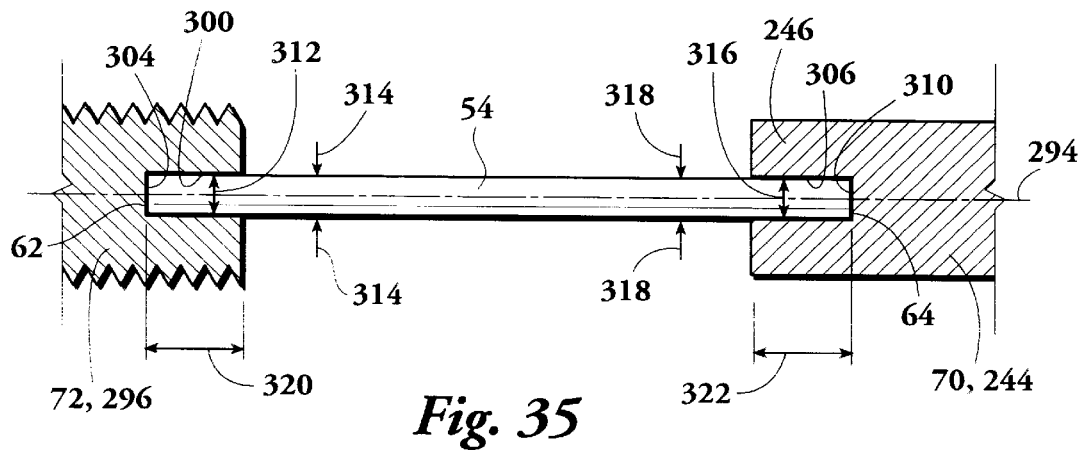
FIG. 35 is a replication of FIG. 34 used for additional description and explanation.

FIGS. 29–31, 34 and 35 exemplify the linearizing means 240 used with a compression pin or buckling pin 54. The preferred pin 54 is a buckling pin which is selected or sized to buckle substantially instantaneously when its buckle pressure is attained. FIGS. 34 and 35 are enlarged views of the buckling pin 54 and its connections to the release support 72 and contact arm 66. The pin 54 has a first end 62 connected to the release support 72, a second end 64 for contacting the contact arm second end 70, and a longitudinal axis 294 extending through the first and second ends 62,64. As the contact arm 66 rotates from the closed position 32 to the open position 34 of the valve 24 (counterclockwise in FIGS. 29–32) the contact arm second end 70 exerts a compressive force on the pin 54. The longitudinal axis 294 of the pin 54 is connected between the release support 72 and the contact arm 66 so that the longitudinal axis 294 of the pin 54 lies on a tangent to the rotational arc of the contact arm second end 70.

More preferably, referring to the example of FIGS. 29–31, 34, and 35, the linearizing means 40 comprises a pin seat 296 connected to the release support 72 for receiving the first end 62 of the pin 54 and a passageway 250 formed on the release support 72, for slidably supporting the second end 64 of the pin 54 in contact with the second end 70 of the contact arm 66. The pin seat 296 and passageway 250 are located to hold the pin 54 with the longitudinal axis 294 of the pin in alignment with a tangent to the rotational arc of the second end 70 of the contact arm 66 so that the pin is subjected to a virtually pure linear and compressive force as the shaft 38 and second end 70 of the contact arm 66 rotate from the closed position 32 to the open position 34 with the valve 24. As previously mentioned, a roller bearing 288 may be connected to the second end 70 of the contact arm 66 for rollingly and compressingly contacting the second end 64 of the pin 54.

More preferably, as previously discussed, the linearizing means 240 includes piston 244, slidably mounted in the passageway 250 on the release support 72 between the pin 54 and the contact arm 66 in such a manner that the piston 244 is slidable coaxially with the longitudinal axis 294 of the pin 54. As exemplified in FIG. 31, when the piston 244 moves from the extended position 262 to the retracted position 264 the pin 54 is compressed or buckled and the piston 244 is latched in the retracted position 264 by latch 270.

Referring to the example of FIGS. 34 and 35, in order to increase the predictability of the buckling pressure of the compression pin 54, the first and second ends 62, 64 of the pin 54 are flat and perpendicular to the longitudinal axis 294 of the pin 54. The pin seat 296 has a pin seat socket 300. The pin seat socket 300 has a longitudinal axis which coincides with the longitudinal axis 294 of the pin 54 when the pin 54 is in the pin seat socket 300. The pin seat socket 300 has a bottom surface 304 which is flat and perpendicular to the longitudinal axis of the pin seat socket 300 so that the flat first end 62 of the pin 54 makes full facial contact with the bottom surface 304, as exemplified in FIG. 34. The first end 246 of piston 244 includes a pin socket 306 for receiving the second end 64 of the pin 54. The pin socket 306 has a longitudinal axis which coincides with the longitudinal axis 294 of the pin 54 when the pin 54 is in the pin socket 306. The pin socket has a bottom surface 310 which is flat and perpendicular to the longitudinal axis of the pin socket 306 so that the flat second end 64 of the pin 54 makes full facial contact with the bottom surface 310 as exemplified in FIG. 34.

To further increase the predictability of the buckling pressure of the compression pin 54, the inside diameter 312 of the pin seat socket 300 should be substantially equal to the outside diameter 314 of the first end 62 of the pin 54 so that the first end 62 of the pin 54 fits tightly or snugly into the pin seat socket 300; and the inside diameter 316 of the pin socket 306 should be substantially equal to the outside diameter 318 of the second end 64 of the pin 54 so that the second end 64 of the pin 54 fits tightly or snugly into the pin socket 306, as exemplified in FIG. 35. By a tight or snug fit is meant that the pin ends 62, 64 should have a friction fit with their respective sockets 300, 306 which requires the application of force along the longitudinal axis 294 of the pin to insert the pin ends 62, 64 into the sockets 300, 306.

To further increase the predictability of the buckling pressure of the compression pin 54, the depth 320 of the pin seat socket 300 should be at least three times greater than the outside diameter 314 of the first end 62 of the pin 54 and the depth 322 of the pin socket 306 should be at least three times greater than the outside diameter of 318 of the second end 64 of the pin 54. The inventors have found that by controlling the pin end 62, 64 and socket 300, 306 sizing and structural configurations as described above, the buckling pressure of the pin can be repeatably predicted within plus or minus one psi. For example, in experimental testing buckling pins which were rated to buckle at 34 psi were all found to buckle within a range of 33–35 psi.

Figure 36:
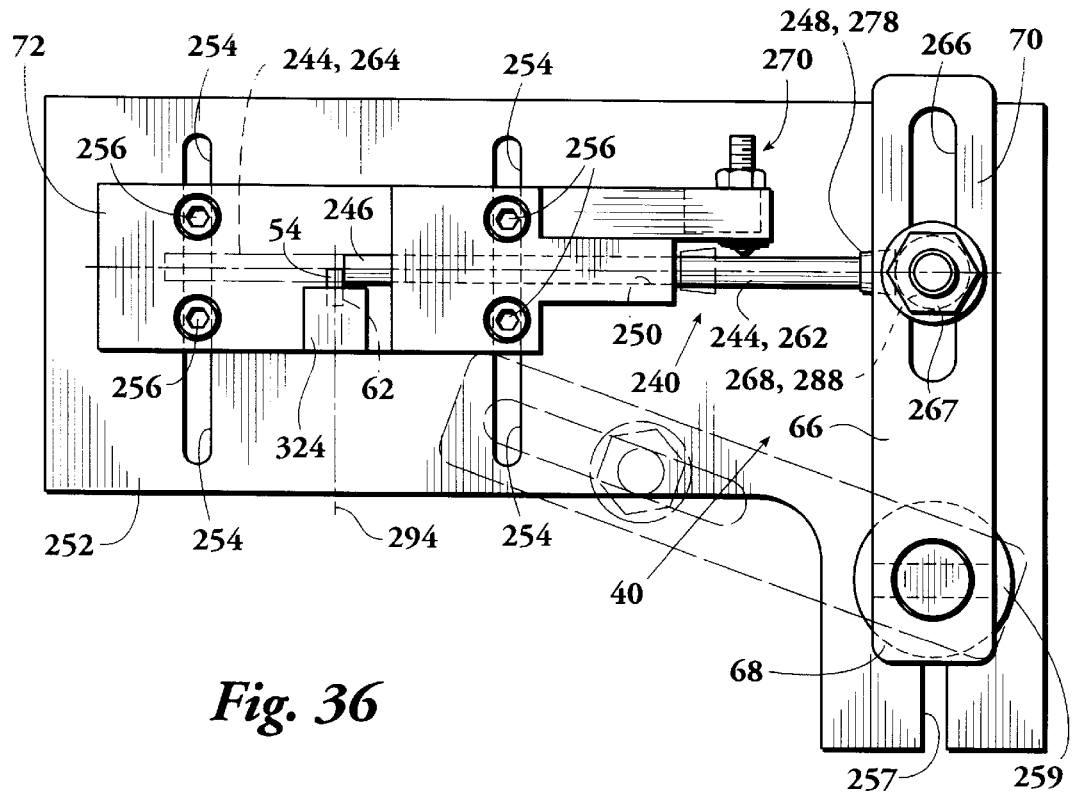
FIG. 36 is an elevational view of another embodiment of the release means of FIG. 30.

Referring to the example embodiment of FIG. 36, the linearizing means 240 is adapted for use with a shear pin 54. A pin support 324 is connected to the release support 72 for receiving the first end 62 of the pin 54 and securely holding the pin 54 with the longitudinal axis 294 of the pin 54 perpendicular to a tangent of the rotational arc of the second end 70 of the contact arm 66. The piston 244 is slidably mounted in the passageway 250 along a tangent of the rotational arc of the second end 70 of the contact arm 66. The first end 246 of the piston 244 contacts the shear pin 54 and the second end 248 of the piston 244 contacts the second end 70 of the contact arm 66. The shear pin 54 holds the piston 244 in the extended position 262 until the torque exerted on the shaft 38 exceeds the preselected magnitude at which the pin 54 shears and allows the piston to travel (to the left in FIG. 36) to the retracted position 264 and the contact arm 66 and valve 24 to rotate (counterclockwise in FIG. 36) to the open position 34. The previously discussed latch 270 may be provided to latch the piston in the retracted position 264. It is contemplated that the linearizing means 240, when used with a shear pin 54 as previously described, will provide for more predictable and repeatable shear pressure because the linearizing means 240 will exert the shearing force in a direction more precisely perpendicular to the longitudinal axis 294 of the shear pin 54. The positioning of the pin support 324 on the release support 72 and/or the positioning of the pin 54 in the pin support 324 should be adjustable to allow for proper alignment, of the pin 54 with the linearizing means 240 and/or piston 244.

As in the embodiments of the release means 40 of FIGS. 2–7, 20–22, and 24–28, in the embodiments of FIGS. 29–38, the various forms of the release means 40, be it a pin, spring, or magnet, as well as the linearizing means 240, should be secured to the contact arm 66 and/or release support 72 in such a manner that they do not interfere with the rotation of the contact arm 66 and valve 24 from the closed position 32 to the open position 34; and the relative positioning of the release means 40, contact arm 66, and linearizing means 240 should be adjustable and adjusted to hold the valve securely in the closed position 32 until the torque exerted on the shaft 38 exceeds the selected magnitude. The release means 40 and linearizing means 240 should be selected and adjusted so there is virtually no rotation of the valve 24 until the torque exerted on the shaft 38 exceeds the selected magnitude at which the valve 24 should as nearly as possible "snap" to the fully opened position 34.

Referring to the example embodiment of FIGS. 29–31, the pin seat 296 has external threads which allow the pin seat to be adjusted along the longitudinal axis 294 of the pin 54 until the pin 54 securely restrains the contact arm 66 and valve 24 in the closed position. The pin seat 296 threadedly engages the internal threads of a collar 326. The collar 326 is securely fastened to the back plate 252 so that the pin seat 296 and passageway 250 may be simultaneously aligned with the tangent of the rotational arc of the second end 70 of the contact arm 66, as previously discussed. The free end 328 of the pin seat 296 which extends out of the collar 326 on the opposite side of the pin 54 is secured against motion by a stop ring 330. More preferably, an antivibration spring 332 is placed around the free end 328 of the pin seat 296 between the stop ring 330 and collar 326 to prevent the stop ring 330 and pin seat 296 from changing position when the assembly 20 is subjected to vibration, as would be known to one skilled in the art in view of the disclosure contained herein.

Figure 37:
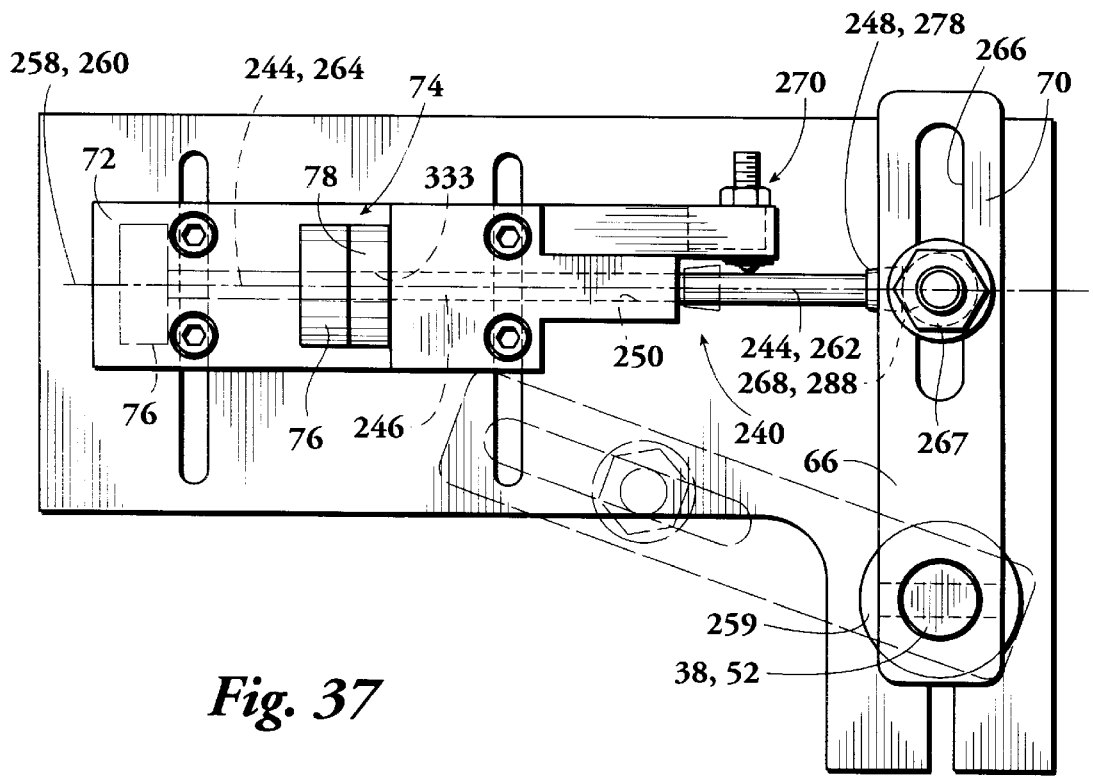
FIG. 37 is an elevational view of another embodiment of the release means of FIG. 30.

Referring to the example embodiment of FIG. 37, the linearizing means 240 may be used with a magnetic catch 74 having a first magnetic element 76 and a second magnetic element 78 located on the release support 72. In the example embodiment, a passageway 333 extends through the second magnetic element 78 and the second magnetic element 78 is fixedly secured to the release support 72. The passageway 333 should be aligned with the passageway 250 so that the passageway 333 effectively extends the passageway 250 through the second magnetic element 78, and the piston 244 may move through both passageways 250, 333 as it is moved between the extended and retracted positions 262, 264. The first magnetic element 76 is secured to the first end 246 of the piston 244. The magnetic attraction between the first and second magnetic elements 76, 78 is selected to hold the piston 244 in the extended position 262 and prevent rotation of the contact arm 66, shaft 38, and valve 24 from the closed position 32 (counterclockwise in FIG. 37) of the valve 24 until the torque exerted on the shaft 38 exceeds a preselected magnitude, at which time the magnetic catch will release and the piston will move towards the retracted position 264 allowing the valve 24 to move to the open position 34. The previously discussed latch 270 may be provided to latch the piston 244 in the retracted position 264 until the piston 244 is manually returned to the extended position 262, as previously discussed. The passageway 333 is extended through the second magnetic element 78 so that the magnetic attraction between the first and second magnetic elements 76, 78 may be balanced about the longitudinal axis 260 of the piston 244 and the desired linearization of the forces acting on the piston 244 and magnetic catch 78 may be achieved. By doing so, the predictability and repeatability of the force required to release the magnetic catch 74 and allow the valve 24 to move from the closed position 32 to the open position 34 are improved.

Figure 38:
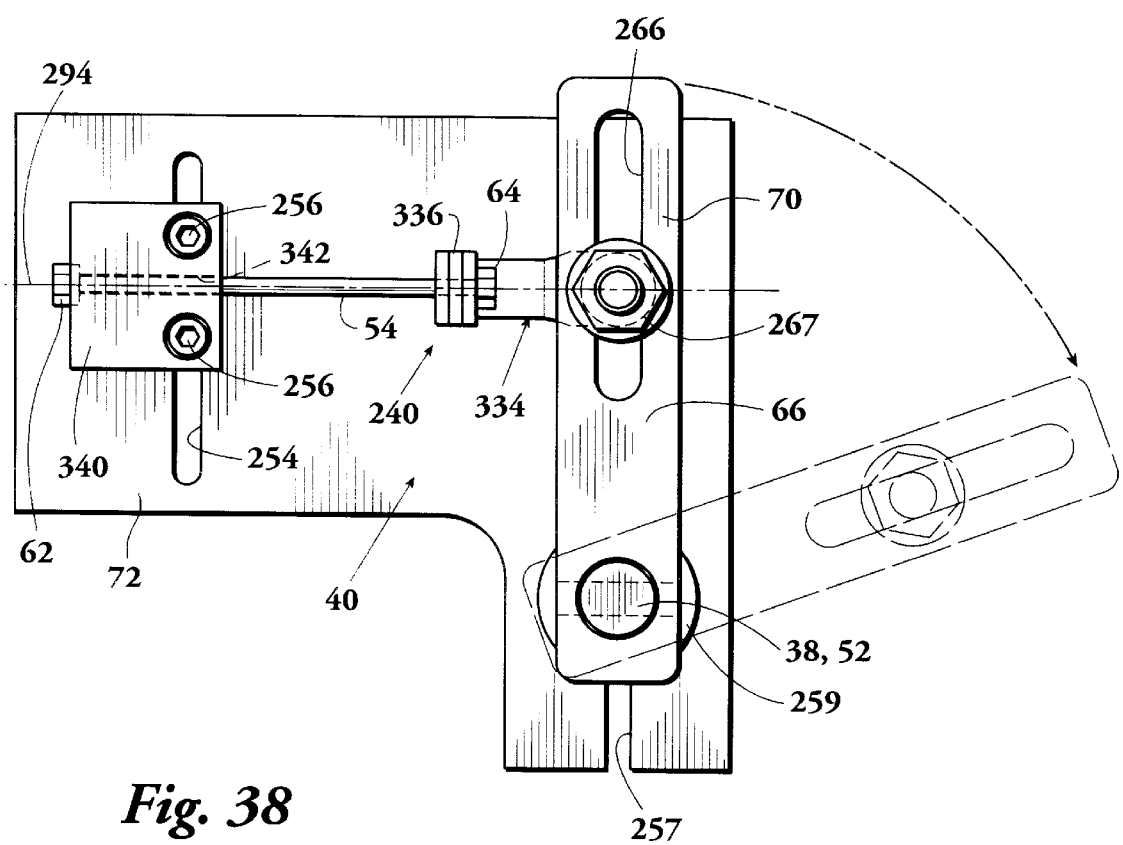
FIG. 38 is an elevational view of another embodiment of the release means.

Referring to the example of FIG. 38, the linearizing means 240 is adapted for use with a tension pin 54. The tension pin 54 has a first end 62 connected to the release support 72 and a second end 64 connected to the second end 70 of the contact arm 66 so that the tension pin prevents rotation of the contact arm 66, shaft 38, and valve 24 from the closed position 32 of the valve 24 (clockwise in FIG. 38) until the torque exerted on the shaft 38 exceeds a preselected magnitude and the tension exerted on the pin 54 breaks the pin 54. A pivotable connector 334 is pivotably connected to the second end 70 of the contact arm 66 for securing the second end 64 of the tension pin 54 to the second end 70 of the contact arm 66. The connector 334 pivots in about the same plane or in a plane parallel to the rotational plane of the contact arm 66 as the contact arm 66 attempts to rotate with the shaft 38 so that the longitudinal axis 294 of the pin 54 remains in alignment with a tangent to the rotational arc of the second end 70 of the contact arm 66. In the prototype assembly exemplified in FIG. 38, a hinged collar clamp 336 is connected to a free end 338 of pivotable connector 334. The hinged collar clamp 336 secures the second end 64 of the tension pin 54 to the pivotable connector 334. The hinged collar clamp 336 allows the second end 64 of the pin 54 to hinge or move in the same plane or in a plane parallel to the rotational plane of the contact arm 66 in order to allow the tensile forces exerted on the pin 54 by the rotating arm 66 to remain linear. The release support 72 includes a pin retainer block 340 which is used to secure the first end 62 of the tension pin 54 to the release support 72. The preferred pin retainer block 340 prevents motion of the tension pin 54 towards the contact arm 66 (until the burst pressure of the pin 54 is exceeded) but allows some lateral motion of the pin 54 so that the longitudinal axis 294 of the pin 62 may remain aligned with the tangent of the arc of rotation of the contact arm 66. The tension pin 54 should be made of a brittle material, such as graphite or glass, which will not stretch when subjected to tensile forces but which will break or burst immediately when the designed rupture pressure of the tension pin 54 is exceeded. In the example embodiment of FIG. 38, the first and second ends 62, 64 of the pin 54 are enlarged to facilitate their retention in the collar clamp 336 and retainer block 340.

Referring to the example of FIGS. 1 and 9, the housing 22 may be of integral, one piece construction, or assembled of components, e.g., the inlet 46 and outlet 48 may be separate components. The housing 22 may also be an integral part of the fluid pressure source, although the preferred assembly 20 is an independent device. In the prototype assembly 20, the inlet 46 and outlet 48 have a common, co-linear axis 136, as exemplified in FIGS. 1 and 9, although the housing 22 may be curved or angled, as would be known to one skilled in the art in view of the disclosure contained herein.

The housing 22 and valve 24 should be shaped to facilitate at least 90 degrees of rotation by the valve 24 (as exemplified in FIGS. 9 and 15) without interfering with the movement of the valve 24. In the prototype assembly 20, the fluid passageway 50 is about circular when viewed axially (as seen in FIGS. 3 and 8), and the valve 24 has a circumference 92 of about the same shape as the fluid passageway 50. spacing rings (not illustrated) may be placed on either or both inlet 46 and outlet 48 sides of the housing to provide additional axial clearance for the valve 24 to rotate, as would be known to one skilled in the art in view of this disclosure.

Figure 8:
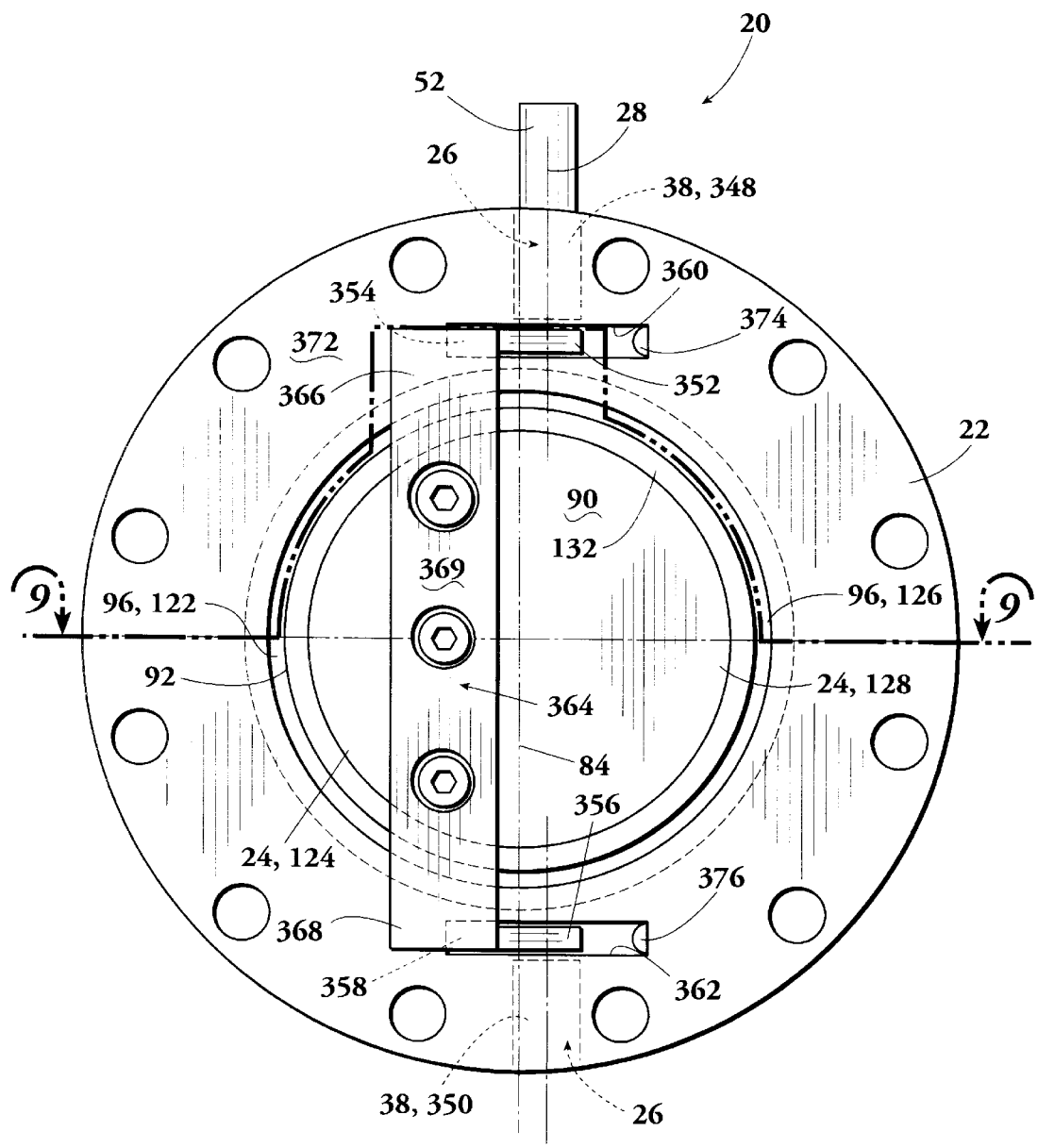
FIG. 8 is an elevational end view of the outlet of a rotatable valve assembly of the present invention.

Referring to the example of FIG. 8, as previously discussed, in the more preferred embodiment of the assembly 20, the mounting means 26 or shaft 38, includes first shaft end 348 and second shaft end 350 which are rotatably disposed in the housing 22, rotatably connect the valve 24 to the housing 22, and define the rotational axis 28 of the valve 24. The rotational axis 28 is offset transversely from the diametrical axis 84 of the valve 24 by the positioning of the first and second shaft ends 348, 350 so that the fluid force in the inlet 46 of the housing 22 will create torque about the rotational axis 28, as previously discussed. Also, the connections of the shaft 38 and shaft ends 348, 350 to the valve 24 are offset axially (axially along the flow axis 136 through the fluid passageway 50 as best seen in FIG. 9) from the seal planes 104, 106 (FIG. 10) so that the connections of the shaft 38 and/or shaft ends 348, 350 to the valve 24 do not physically obstruct or interfere with the gap 94 and/or seal 96. This may be accomplished by relieving or cutting out the shaft ends 348, 350 where their connection to the valve 24 coincides with the gap 94 and seal 96. Preferably, the first and second shaft ends 348, 350 do not extend into the fluid passageway 50.

The transverse offset of the rotational axis 28 from the diameter 84 of the valve 24 creates the fluid force imbalance and torque about the rotational axis 28. The rotational axis 28 passes through the valve 24 in a position which creates a larger first portion 124 of valve 24 and a smaller second portion 128 of valve 24. Since the fluid pressure exerts greater force on the valve 24 on the larger first portion 124 of the valve 24, the larger first portion 124 of the valve 24 is pushed towards the outlet 48 of the housing 22, thereby defining the direction of rotation of the valve 24.

In the prototype assembly 20, a first offset bracket 352 is connected between the first shaft end 348 and the valve 24 such that the joining 354 of the first offset bracket 352 to the valve 24 is offset from the rotational axis 28; and a second offset bracket 350 is connected between the second shaft end 350 and the valve 24 such that the joining 358 of the second offset bracket 356 to the valve 24 is offset from the rotational axis 28. In the prototype assembly 20, the first and second offset brackets 352, 356 extend through slots 360, 362 in the housing 22 between the first and second shaft ends 348, 350 and fluid passageway 50. The slots 360, 362 allow the first and second offset brackets 352, 356 to transmit rotation of the valve 24 to the first and second shaft ends 348, 350 and thereby to transmit torque from the shaft 38 to the release means 40. The preferred offset brackets 352, 356 and disk bracket 364 are connected to the outlet face 90 of the valve 24 (rather than the inlet face 88) so that the outlet brackets 352, 356, slots 360, 362, and shaft ends 348, 350 are not normally exposed to the fluids and pressures present in the housing inlet 46.

The disk bracket 364 is securely fastened or connected to the outlet face 90 of the valve 24. The disk bracket 364 has opposite first and second ends 366, 368 which extend off of the valve 24. The offset brackets 352, 360 are welded to the opposite ends 366, 368 of the disk bracket 304 in the prototype assembly 20. As the valve 24 rotates from the closed position 32 to the open position 34, the first and second ends 366, 368 of the disk bracket 364 rotate in slots 360, 362 until the outlet face 369 of the disk bracket at the disk bracket ends 366, 368 contacts the ends of the slots 360, 362. The slots 360, 362 should be sized to allow the valve 24 to rotate at least 90°, i.e., such that the diametrical plane of the valve 24 is about parallel with the flow axis 136 of the housing inlet and outlet 46, 48. Also, the slots 360, 362 and disk bracket 364 at the bracket ends 366, 368 should be constructed so that when the valve 24 is in the closed position 32, the inlet face 370 (FIG. 9) of the disk bracket 364 at the bracket ends 366, 368 contacts the outlet face 372 of the housing 22 so that the valve 24 is securely fixed and properly aligned in the closed position 32.

First and second bumpers 374, 376 are provided at the ends of slots 360, 362 so that the outlet face 369 contacts the bumpers 374, 376 in the open position 34 of the valve 24. The bumpers 374, 376 should be made of a resilient polymer, plastic, or elastomer, such as Viton®, which will compress sufficiently to allow the valve 24 to open a full 900 when a pressure-relieving event occurs. The first and second bumpers 374, 376 should also be strong enough to prevent the disk bracket 364 from slamming into the housing 22 in a damaging manner, as will be known to one skilled in the art in view of the disclosure contained herein.

While presently preferred embodiments of the invention have been described herein for the purpose of disclosure, numerous changes in the construction and arrangement of parts and the performance of steps will suggest themselves to those skilled in the art in view of the disclosure contained herein, which changes are encompassed within the spirit of this invention, as defined by the following claims.

What is claimed is:

1. A linearizing mechanism, for converting the torsional force of a rotatable shaft into a linear force on a housing adjacent the shaft, comprising:
   a release mechanism, located on the housing, for preventing rotation of the shaft from a closed position to an open position when the torque exerted on the shaft is below a selected magnitude and for releasing the shaft in order to allow rotation of the shaft to the open position when the torque exerted on the shaft exceeds a selected magnitude, the release mechanism comprising:
      a contact arm having a first end connected to the shaft and a second end spaced away from the rotational axis of the shaft;
      a release support connected to the housing; and
      a pin connected to the release support and obstructing rotation of the second end of the contact arm and shaft until the torque exerted by the shaft exceeds a selected magnitude; and
   a pin seat, connected to the release support, for receiving a first end of the pin; and
   a passageway, formed on the release support, for slidably supporting a second end of the pin in contact with the second end of the contact arm, the pin seat and passageway holding the pin with the longitudinal axis of the pin in alignment with a tangent to a rotational arc of the second end of the contact arm so that the pin is subjected to a linear and compressive force as the shaft and second end of the contact arm rotate from the closed position to the open position.

2. Linearizing mechanism of claim 1, comprising:
   a roller bearing connected to the second end of the contact arm for rollingly and compressingly contacting the second end of the pin.

3. Linearizing mechanism of claim 2, comprising:
   a piston, slidably mounted in the passageway on the release support between the pin and the contact arm and being slidable coaxially with the longitudinal axis of the pin, the piston having a first end for contacting the second end of the pin and a second end for contacting the second end of the contact arm, the piston being slidable between an extended position when the shaft is in the closed position and a retracted position when the shaft is in the open position.

4. Linearizing mechanism of claim 3, comprising:
   a roller bearing, connected to one of the second end of the contact arm or the second end of the piston, for rollingly and compressingly transferring the force of the second end of the contact arm through the piston to the pin.

5. Linearizing mechanism of claim 1:
wherein the first and second ends of the pin are defined as being flat and perpendicular to the longitudinal axis of the pin; and
wherein the pin seat comprises:
a pin seat socket having a longitudinal axis which coincides with the longitudinal axis of the pin when the pin is in the pin seat socket, the pin seat socket having a bottom surface which is flat and perpendicular to the longitudinal axis of the pin seat socket.

6. Linearizing mechanism of claim 1:
wherein the first and second ends of the pin are flat and perpendicular to the longitudinal axis of the pin; and
wherein the pin seat comprises:
a pin seat socket for receiving the first end of the pin and having a longitudinal axis which coincides with the longitudinal axis of the pin when the pin is in the pin seat socket, the pin seat socket having a bottom surface which is flat and perpendicular to the longitudinal axis of the pin seat socket; and
wherein the first end of the piston comprises:
a pin socket for receiving the second end of the pin and having a longitudinal axis which coincides with the longitudinal axis of the pin when the pin is in the pin socket, the pin socket having a bottom surface which is flat and perpendicular to the longitudinal axis of the pin socket.

7. Linearizing mechanism of claim 6:
wherein the inside diameter of the pin seat socket is substantially equal to the outside diameter of the first end of the pin so that the first end of the pin fits tightly into the pin seat socket; and
wherein the inside diameter of the pin socket is substantially equal to the outside diameter of the second end of the pin so that the second end of the pin fits tightly into the pin socket.

8. Linear mechanism of claim 7:
wherein the depth of the pin seat socket is at least three times greater than the outside diameter of the first end of the pin; and
wherein the depth of the pin socket is at least three times greater than the outside diameter of the second end of the pin.

9. Linearizing mechanism of claim 3 in which the release support comprises:
a latch having a first end connected to the release support and a second end disposed between the second end of the piston and the pin when the shaft is in the closed position and the piston is in the extended position, the latch comprising:
bias means for biasing the second end of the latch into a position obstructing movement of the piston towards the extended position when the piston is in the retracted position.

10. A linearizing mechanism, for converting the torsional force of a rotatable shaft into a linear force on a housing adjacent the shaft, comprising:
a release mechanism, located on the housing, for preventing rotation of the shaft from a closed position to an open position when the torque exerted by the shaft is below a selected magnitude and for releasing the shaft in order to allow rotation of the shaft to the open position when the torque exerted by the shaft exceeds a selected magnitude, the release mechanism comprising:
a contact arm having a first end connected to the shaft and a second end spaced away from the rotational axis of the shaft;
a release support, connected to the housing for supporting the linearizing mechanism;
a shear pin; and
a pin support, connected to the release support, for receiving a first end of the pin and securely holding the pin with the longitudinal axis of the pin perpendicular to a tangent of a rotational arc of the second end of the contact arm; and
in which the linearizing mechanism further comprises:
a passageway, formed on the release support and extending between the pin and the contact arm; and
a piston, slidably mounted in the passageway along a tangent of the rotational arc of the second end of the contact arm, the piston having a first end for contacting the shear pin and a second end for contacting the second end of the contact arm, the piston being slidable between an extended position when the shaft is in the closed position and a retracted position when the shaft is in the open position, the shear pin holding the piston in the extended position and the shaft in the closed position until the torque exerted on the shaft exceeds a preselected magnitude and the pin shears.

11. A linearizing mechanism, for converting the torsional force of a rotatable shaft into a linear force on a housing adjacent the shaft, comprising:
a release mechanism, located on the housing, for preventing rotation of the shaft from a closed position to an open position when the torque exerted by the shaft is below a selected magnitude and for releasing the shaft in order to allow rotation of the shaft to the open position when the torque exerted on the shaft exceeds a selected magnitude, the release mechanism comprising:
a contact arm having a first end connected to the shaft and a second end spaced away from the rotational axis of the shaft;
a release support, connected to the housing, for supporting the linearizing mechanism; and
a magnetic catch having a first magnetic element and a second magnetic element located on the release support; and
in which the linearizing mechanism further comprises:
a passageway formed on the release support and extending between the second magnetic element and the contact arm; and
a piston, slidably mounted in the passageway along a tangent of the rotational arc of the second end of the contact arm, the piston including a first magnetic element at a first end of the piston and a second end for contacting the second end of the contact arm, the piston being slidable between an extended position when the shaft is in the closed position and a retracted position when the shaft is in the open position, the magnetic attraction between the first and second magnetic elements being selected to hold the piston in the extended position and prevent rotation of the contact arm and shaft from the closed position until the torque exerted on the shaft exceeds a preselected magnitude.

12. A linearizing mechanism, for converting the torsional force of a rotatable shaft into a linear force on a housing adjacent the shaft, comprising:
a release mechanism, located on the housing, for preventing rotation of the shaft from a closed position to an open position when the torque exerted on the shaft is below a selected magnitude and for releasing the shaft in order to allow rotation of the shaft to the open position when the torque exerted on the shaft exceeds a selected magnitude, the release mechanism comprising:

a contact arm having a first end connected to the shaft and a second end spaced away from the rotational axis of the shaft;

a release support connected to the housing; and a tension pin having a first end connected to the release support and a second end connected to the second end of the contact arm so that the pin prevents rotation of the contact arm and shaft from the closed position until the torque exerted on the shaft exceeds a preselected magnitude, the tension pin having a longitudinal axis extending through the first and second ends; the linearizing mechanism further comprising:

a pivotable connector, pivotably connected to the second end of the contact arm for securing the second end of the tension pin to the second end of the contact arm, the connector pivoting as the contact arm rotates with the shaft from the closed position to the open position of the valve so that the longitudinal axis of the pin remains in alignment with a tangent to a rotational arc of the second end of the contact arm.

13. Mechanism of claim 12:

wherein the tension pin is further defined as being made of a brittle material which will not stretch when subjected to tensile forces.

* * * * *